United States Patent [19]
Uda et al.

[11] Patent Number: 5,933,580
[45] Date of Patent: Aug. 3, 1999

[54] SCANNER PRINTER SERVER

[75] Inventors: Toyokazu Uda, Yokohama; Susumu Sugiura, Atsugi; Makoto Takaoka, Yokohama; Shigetada Kobayashi, Tokyo, all of Japan

[73] Assignee: Canon Kabushiki Kaisha, Tokyo, Japan

[21] Appl. No.: 07/939,144

[22] Filed: Sep. 2, 1992

[30] Foreign Application Priority Data

| Sep. 4, 1991 | [JP] | Japan | 3-224218 |
| Feb. 13, 1992 | [JP] | Japan | 4-026823 |
| Jul. 27, 1992 | [JP] | Japan | 4-199744 |

[51] Int. Cl.⁶ .................................................. G06F 13/00
[52] U.S. Cl. .......................... 395/112; 395/114; 395/839; 358/408
[58] Field of Search ................... 358/402, 403, 358/407, 408, 442, 444, 468; 395/114, 200, 275, 117, 112, 837, 838, 839, 835; 370/94.1; 379/100

[56] References Cited

U.S. PATENT DOCUMENTS

| 4,463,444 | 7/1984 | Daniels et al. | 395/117 |
| 4,536,874 | 8/1985 | Stoffel et al. | 370/94.1 |
| 4,754,428 | 6/1988 | Schultz et al. | 395/275 |
| 4,827,349 | 5/1989 | Ogata et al. | 358/442 |
| 4,900,902 | 2/1990 | Sakakibara | 358/468 |
| 4,910,765 | 3/1990 | Matsuse et al. | 379/100 |
| 4,947,345 | 8/1990 | Paradise et al. | 358/442 |
| 5,041,918 | 8/1991 | Ishida et al. | 358/442 |
| 5,123,063 | 6/1992 | Ohkubo | 358/408 |
| 5,220,674 | 6/1993 | Morgan et al. | 395/200 |
| 5,226,112 | 7/1993 | Mensing et al. | 395/114 |
| 5,228,118 | 7/1993 | Sasaki | 395/112 |
| 5,353,388 | 10/1994 | Motoyama | 395/117 |
| 5,377,016 | 12/1994 | Kashiwagi et al. | 358/468 |
| 5,428,458 | 6/1995 | Aiba et al. | 358/468 |
| 5,475,801 | 12/1995 | Brindle et al. | 395/114 |
| 5,717,501 | 2/1998 | Iwamoto et al. | 358/468 |

*Primary Examiner*—Scott Rogers
*Attorney, Agent, or Firm*—Fitzpatrick, Cella, Harper & Scinto

[57] ABSTRACT

A variety of parameters for a scanner printer are set from a host computer on a network by arranging a scanner printer server system composed of the host computer and the scanner printer server connected to the network, and a scanner and a printer connected to the scanner printer. The scanner printer server system has a bidirectional communication channel formed between the scanner, the printer and the scanner printer server, wherein characters, graphics and a method of transferring image are instructed from the host computer and the data is transferred by the instructed transference method.

14 Claims, 19 Drawing Sheets

FIG. 18(a)

| PRESCAN |
|---|
| SCANNER NAME |
| XSIZE |
| YSIZE |
| XSTART |
| YSTART |
| XZOOM |
| YZOOM |
| FORMAT |
| EDGE |
| COLOR TYPE |
| COLOR |
| LEVEL |
| CODE |
| BIT RATE |
| XSTEP |
| YSTEP |

FIG. 18(b)

| SCAN |
|---|
| SCANNER NAME |
| XSIZE |
| YSIZE |
| XSTART |
| YSTART |
| XZOOM |
| YZOOM |
| FORMAT |
| EDGE |
| COLOR TYPE |
| COLOR |
| LEVEL |
| CODE |
| BIT RATE |
| XSTEP |
| YSTEP |

FIG. 18(c)

| PRINT |
|---|
| DATA TYPE |
| PRINTER NAME |
| XSIZE |
| YSIZE |
| XSTART |
| YSTART |
| XZOOM |
| YZOOM |
| FORMAT |
| EDGE |
| COLOR TYPE |
| COLOR |
| LEVEL |
| CODE |
| UCR |
| BI – LEVEL |
| THRESHOLD |
| PAGE |

FIG. 18(d)

| OK |
|---|

FIG. 18(i)

| ESC |
|---|
|  |

FIG. 18(e)

| GAMMA |
|---|
| S/P |
| 1 |
| 2 |
| 3 |
|  |

FIG. 18(f)

| MASKING |
|---|
| a11 |
| a12 |
| a13 |
| a14 |
|  |

FIG. 18(g)

| STATUS |
|---|
| N |
| STATUS 1 |
| STATUS 2 |
| STATUS 3 |
|  |

FIG. 18(h)

| DATA |
|---|
| N |
| 1 |
| 2 |
| 3 |
|  |

FIG. 19(a)

| PRESCAN |
|---|
| SCANNER NAME |
| XSIZE |
| YSIZE |
| XSTART |
| YSTART |
| XZOOM |
| YZOOM |
| FORMAT |
| EDGE |
| COLOR TYPE |
| COLOR |
| LEVEL |

FIG. 19(b)

| SCAN |
|---|
| SCANNER NAME |
| XSIZE |
| YSIZE |
| XSTART |
| YSTART |
| XZOOM |
| YZOOM |
| FORMAT |
| EDGE |
| COLOR TYPE |
| COLOR |
| LEVEL |

FIG. 19(c)

| PRINT |
|---|
| DATA TYPE |
| PRINTER NAME |
| XSIZE |
| YSIZE |
| XSTART |
| YSTART |
| XZOOM |
| YZOOM |
| FORMAT |
| EDGE |
| COLOR TYPE |
| COLOR |
| LEVEL |
| UCR |
| BI − LEVEL |
| THRESHOLD |
| PAGE |

FIG. 19(d)

| OK |
|---|

FIG. 19(e)

| GAMMA |
|---|
| S/P |
| 1 |
| 2 |
| 3 |
| ⋮ |

FIG. 19(f)

| MASKING |
|---|
| a11 |
| a12 |
| a13 |
| a14 |
| ⋮ |

FIG. 19(g)

| STATUS |
|---|
| N |
| STATUS 1 |
| STATUS 2 |
| STATUS 3 |
| ⋮ |

FIG. 19(h)

| COPY |
|---|

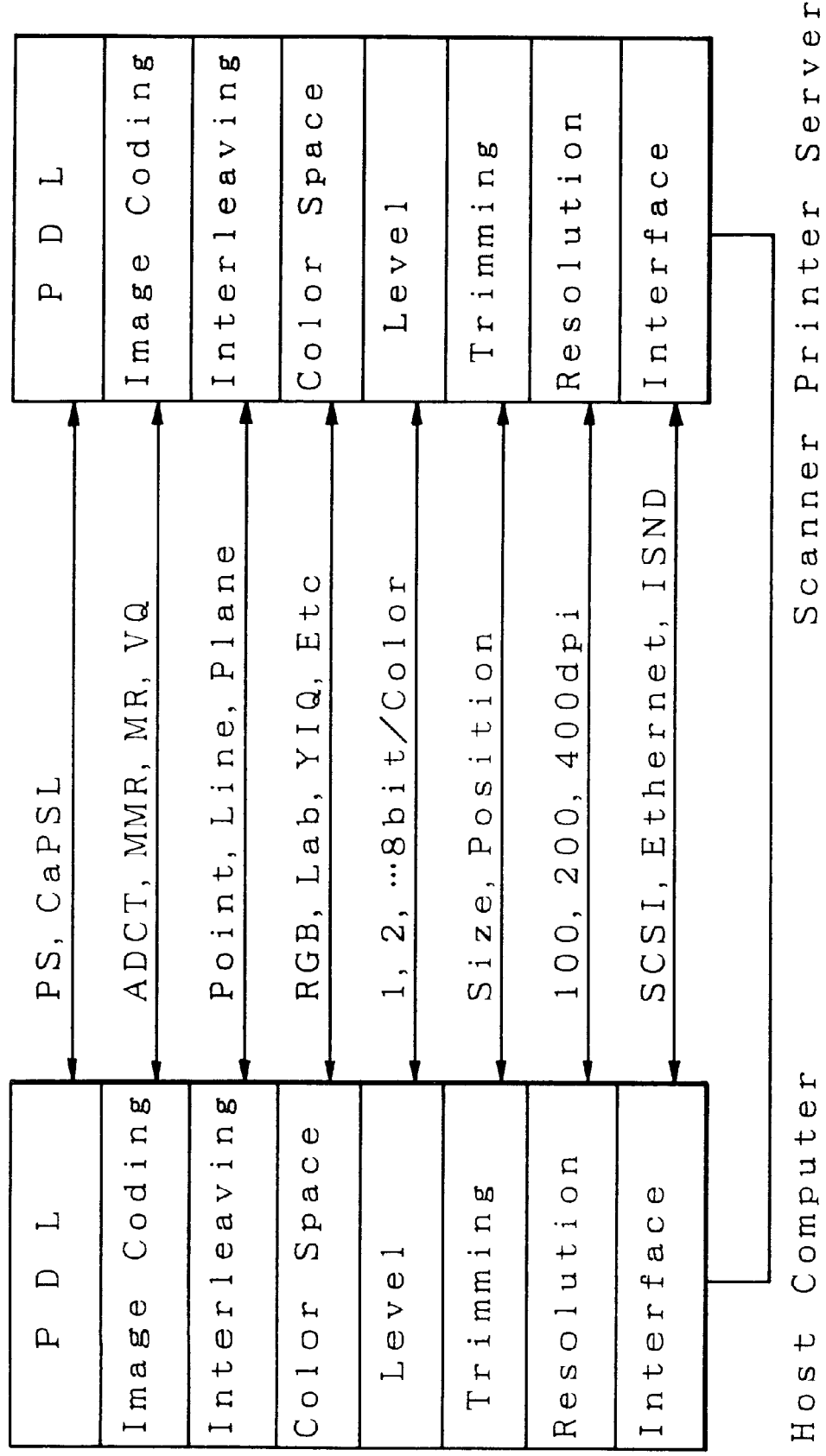

SCANNER PRINTER SERVER

BACKGROUND OF THE INVENTION

1. Field of the Invention

The present invention relates to a scanner printer server system constituted by connecting a integrated type scanner printer to a network.

2. Description of the Prior Art

Hitherto, a sole scanner or a printer has been used in such a manner that it has been directly connected to the host computer. On the other hand, an integrated type scanner printer has been usually used solely as a copying machine and the scanner or the printer of the above-described type has not been used as a scanner printer server while being connected to a network.

On the other hand, there has been used a structure in which a printer is commonly used while being connected to a printer server on a network. In the usual case, a printer server of the aforesaid type transfers data adaptable to the specifications of the printer from the host computer to the printer.

Recently, network systems have been widely used and a large scale network has been employed in which the LAN is arranged in the overall context of an intelligent building or the like for example. Furthermore, a nationwide network such as WAN (wide area network) in which the LAN is directly connected by public lines and an advanced information network such as ISDN have become available.

Therefore, it has been possible for a host computer on one floor in one building to be utilized from another floor of the building or from another building, or a host computer located in Osaka can be utilized from Tokyo.

Therefore, the printer server should become available for use in a very wide region as well as in a relatively narrow area, which has been so far achieved.

Furthermore, the scanner printer has been advanced in function and resolution, and color scanner printers have become available. Therefore, data can be read from various scanners so as to be transmitted to the printer.

The method of transferring an image has generally been set by a host computer directly connected to the scanner or the printer.

On the other hand, a system so arranged that the scanner and the printer are both connected to the network will enable a user to utilize a distant scanner and printer by using the host computer located on the network.

This is very effective because a plurality of users are then able to utilize the distant scanner and the printer from a plurality of host computers.

In order to perform communication between the host computer and the scanner printer server, each layer of the control/programming hierarchy must be aligned with its corresponding layer across the communication channel. The layers may be those as shown in FIG. 20:

1) Page description language (PDL) such a PostScript or CaPSL
2) Image encoding method such as ADCT, MMR, MR, VQ (Vector Quantizing)
3) Format such as a dot sequential, line sequential, or plane sequential method (interleaving)
4) Color space such as RGB, Lab, or YIQ
5) Number of gradations expressed by 1, 2, . . . , 8 bits/Color
6) Size and position of the image (trimming)
7) Resolution expressed by 100 dpi, 200 dpi or 400 dpi, or the like In a case of a scanner printer server to which a plurality of scanners and printers or an integrated scanner printer is connected, the process to be performed by the server before the transmission of data has varied due to the differences in the performance of their I/O devices.

In the usual case, priority is given to the fact that scanning or printing is performed in the form required by a user of the host computer. Therefore, the scanner printer side has a variety of conversion means to scan or print data in the form required by the user.

Hence, the parameters for the distant scanner or the printer for use at the time of the various conversions must be set from the host computer.

SUMMARY OF THE INVENTION

Accordingly, an object of the present invention is to provide a scanner printer server with which the labor required to perform various settings can be reduced.

Another object of the present invention is to provide a scanner printer server with which the labor required to perform various settings can be omitted.

Another object of the present invention is to provide a scanner printer server which can be adapted to data expressed by page description language or data which is not expressed by page description language.

In order to achieve the aforesaid objects, according to one aspect of the invention, there is provided a scanner printer server system composed of a host computer and a scanner printer server connected to a network, a scanner and a printer being connected to the scanner printer, the scanner printer server system being characterized in that the printer or the scanner printer server has at least one function selected from a page description language conversion and a decoding function, the printer has at least one function selected from a color space conversion, a resolution conversion, a gamma conversion, a masking conversion, a black generation, a base color removal and an N-value coding function, where data transmitted from the host computer is converted in accordance with an image parameter supplied from the host computer, and the converted data is printed.

These and further objects, features and advantages of the invention will be appear more fully from the following description.

BRIEF DESCRIPTION OF THE DRAWINGS

FIGS. 18a–18i illustrates packets;

FIGS. 19a–19h illustrates commands between the scanner printer server and the scanner printer;

FIG. 20 illustrates communication to be performed between the scanner, the printer and the scanner printer server.

DESCRIPTION OF THE PREFERRED EMBODIMENTS

Preferred embodiments of the present invention will now be described.

Figure 1:
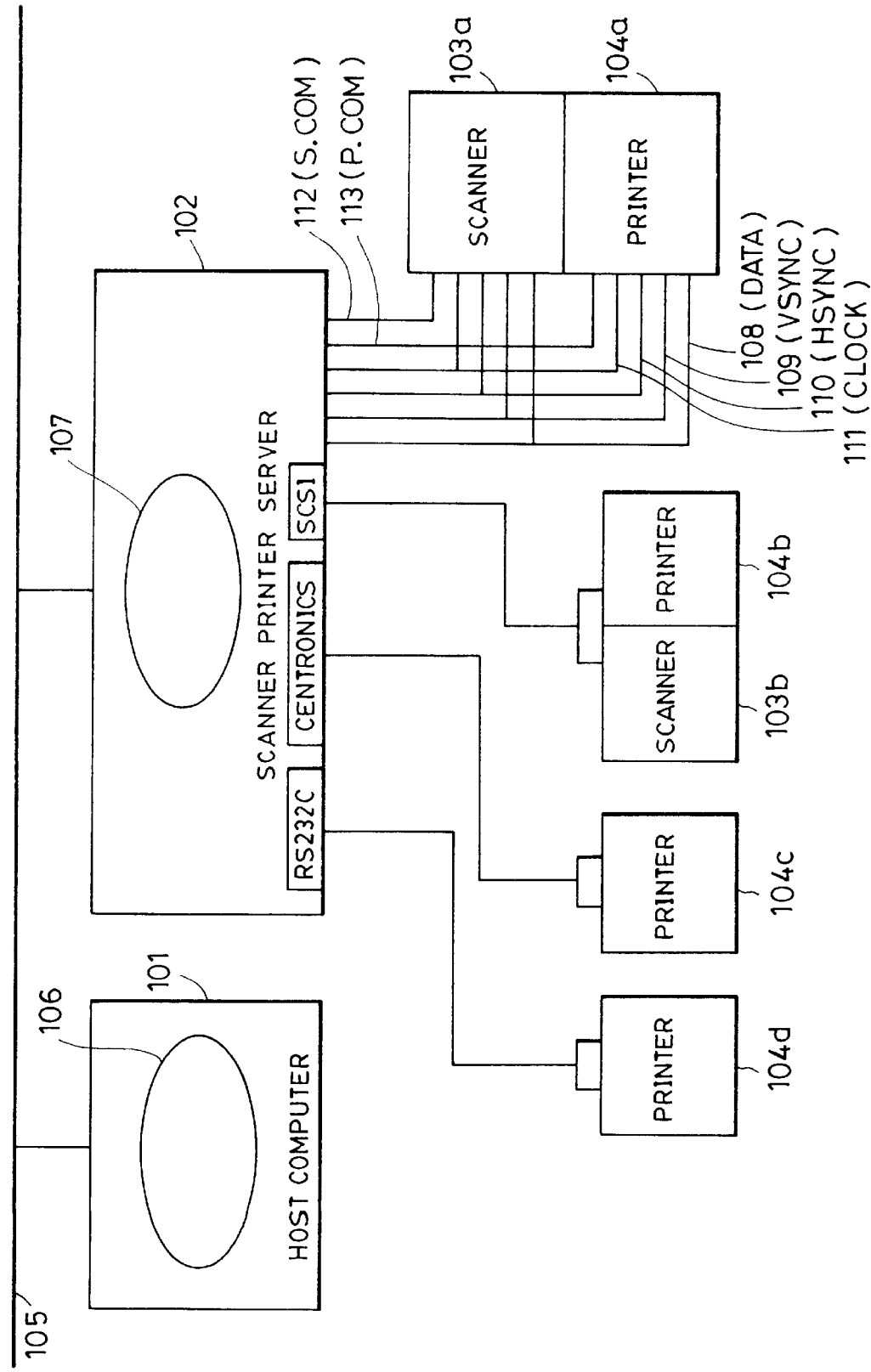
FIG. 1 is a structural view which illustrates a system according to the present invention.

Referring to FIG. 1, reference numeral 101 represents a host computer, 102 represents a scanner printer server, 103a to 103b represent various scanners, 104a to 104d represent various printers, and 105 represents an ethernet.

Reference numeral 106 represents a client process, 107 represents a server process, 108 represents DATA (an image data signal), 109 represents a VSYNC (a vertical synchronizing signal), 110 represents a HSYNC (a horizontal synchronizing signal), 111 represents a CLOCK (a clock signal), 112 represents a S.COM (a scanner serial command signal), and 113 represents a P.COM (a printer serial command signal).

The DATA (the image data signal) 108, the VSYNC (the vertical synchronizing signal) 109, the HSYNC (the horizontal synchronizing signal) 110 and the CLOCK (the clock signal) 111 are collectively called a Video I/F (interface).

A variety of connections established between the interface and the scanner or the printer are illustrated in such a way that an SCSI interface is used to establish a connection with the scanner 103b and the printer 104b, a Centronics I/F is used to connect the printer 104c and an RS232C interface is used to connect the printer 104d.

In general, both the scanner and the printer are connected to the SCSI, and a printer is usually connected to the Centronics I/F or the RS232C. The scanners and the printers to be connected to the aforesaid I/Fs have variable functions therein.

Since the Video I/F is an interface for mainly transmitting/receiving raw image data, the scanners or the printers to be connected usually have neither the page description language developing function nor the compression/expansion function.

The scanners and the printers are collectively represented by reference numerals 103 and 104, and the interface Video I/F is employed as an example.

The host computer 101 executes the client process 106 for controlling the various scanners 103a to 103b or the printers 104a to 104d.

In the scanner printer server 102, the server process 107 is executed under control performed by the client process 106 so as to control the scanner 103 (which represents the scanners 103a to 103b) and the printer 104 (which represents the printers 104a to 104d).

The client process 106 communicates with the server process 107 via the ethernet 105 so as to read an image transmitted from the scanner 103 and as well to cause the printer 104 to print the image. An independent copying operation between the scanner 103 and the printer 104 can be performed.

Figure 2:
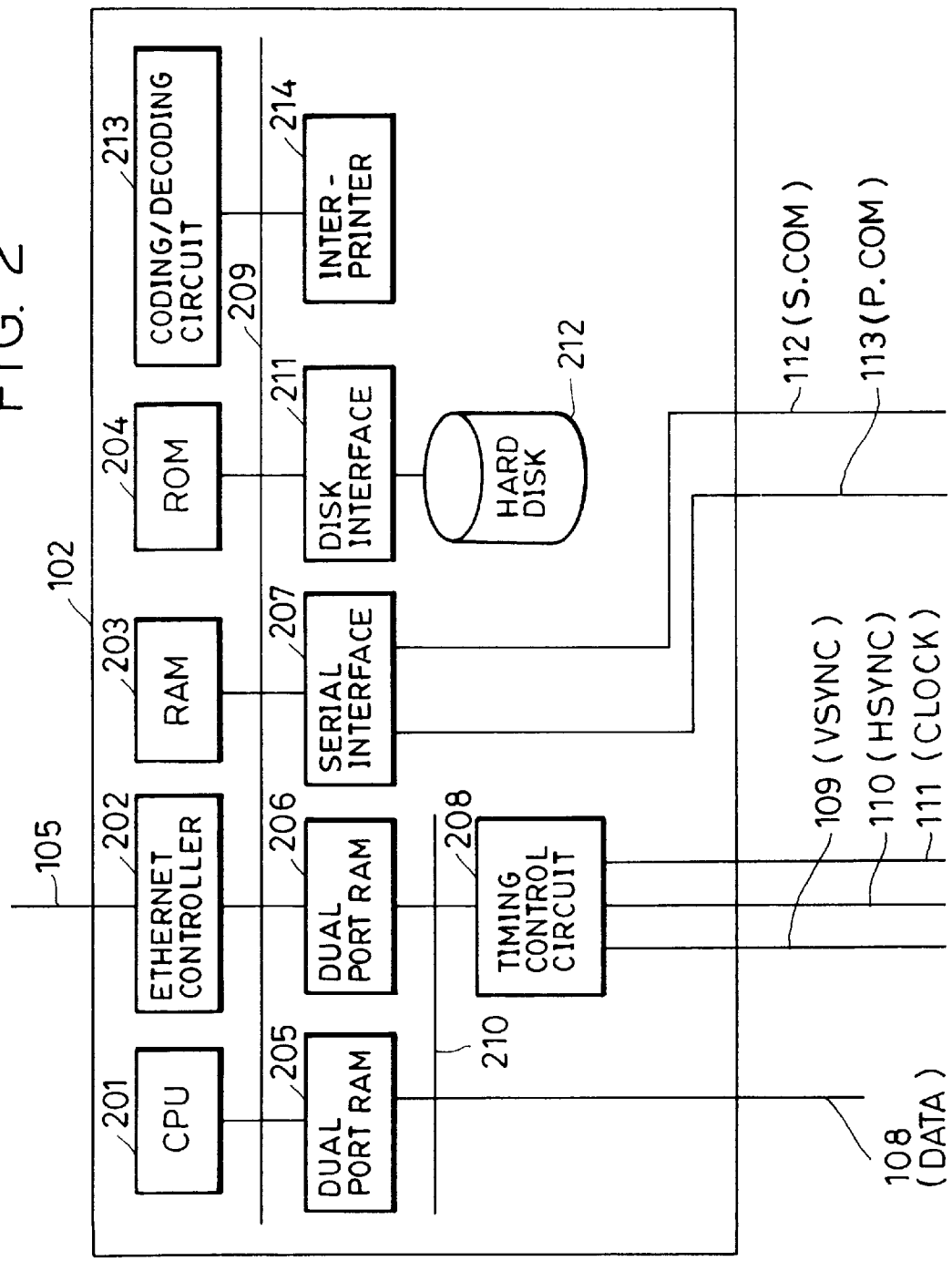
FIG. 2 is a structural view which illustrates a scanner printer server.

FIG. 2 is a structural view which illustrates the scanner printer server 102.

Reference numeral 201 represents a CPU, 202 represents an ethernet controller, 203 represents a RAM, 204 represents a ROM, 205 and 206 represent dual port rams, 207 represents a serial interface, 208 represents a timing control circuit, 209 represent a main bus, 210 represents a data bus, 211 represents a disk interface, 212 represents a hard disk, 213 represents an encoding/decoding circuit and 214 represents an interpreter for developing the page description language.

When the scanner printer server 102 is started, the CPU 201 starts the program stored in the ROM 204 so as to execute the server process 107 while making the RAM 203 a temporal storage portion. At this time, communication with the client process 106 of the host computer 101 can be performed by establishing a connection with the ethernet 105 by means of the ethernet controller 202.

The serial interface 207 communicates a command between the scanner printer server 102 and the scanner 103 and the printer 104 in a serial manner.

The dual port rams 205 and 206 are accessible from both of the main bus 209 and the data bus 210. The aforesaid dual port rams 205 and 206 are controlled by the timing control circuit 208 so as to transfer data between the scanner 1(03 arid the printer 104 by the dual buffer system. The transference at this time is performed by the synchronization system including the signals VSYNC (the vertical synchronizing signal) 109, the HSYNC (horizontal synchronizing signal) 110 and the CLOCK (the clock signal) 111.

The serial interface 207 communicates a command with the scanner 103 by means of the S.COM (the scanner serial command signal) 112 by serial transmission. Similarly, the serial interface 207 communicates a command with the printer 104 by means of the P.COM (the printer serial command signal) 113 by serial transmission.

As the aforesaid data to be transmitted, a prescan command, a scan command or the like is transmitted from the scanner printer server 102 to the scanner 103. On the other hand, a copy command or status information denoting, for example, an operation abnormality is transmitted from the scanner 103. Similarly, a print command or the like is transmitted from the scanner printer server 102 to the printer 104. On the other hand, status information such as paper out or paper jam operation abnormality is transmitted from the printer 104.

The disk interface 211 is an interface to establish a connection with the hard disk 212.

The encoding/decoding circuit 213 encodes data read from the scanner 103, and also decodes encoded image data transmitted from the ethernet 105. The encoding operation is performed by an ADCT method for example.

The ADCT encoding method is an encoding method for color still images which is being subjected to a standardizing operation by JPEG (Joint Photographics Expert Group), which is the joined organization of CCITT SG VIII and ISO/TC97/SC2/WG8 to meet a formal counsel which will be made in 1991 (see Mar. 19, 1990 issue of Nikkei Electronics).

The interpreter 214 interprets PDL (Page Description Language) so as to develop the image by a bit map or a byte map in the dual port rams 205 and 206. As a result, the printer 104 is caused to print the image. The PDL is exemplified by Post Script, or CaPSL (CAnon Printing System Language).

Figure 3:
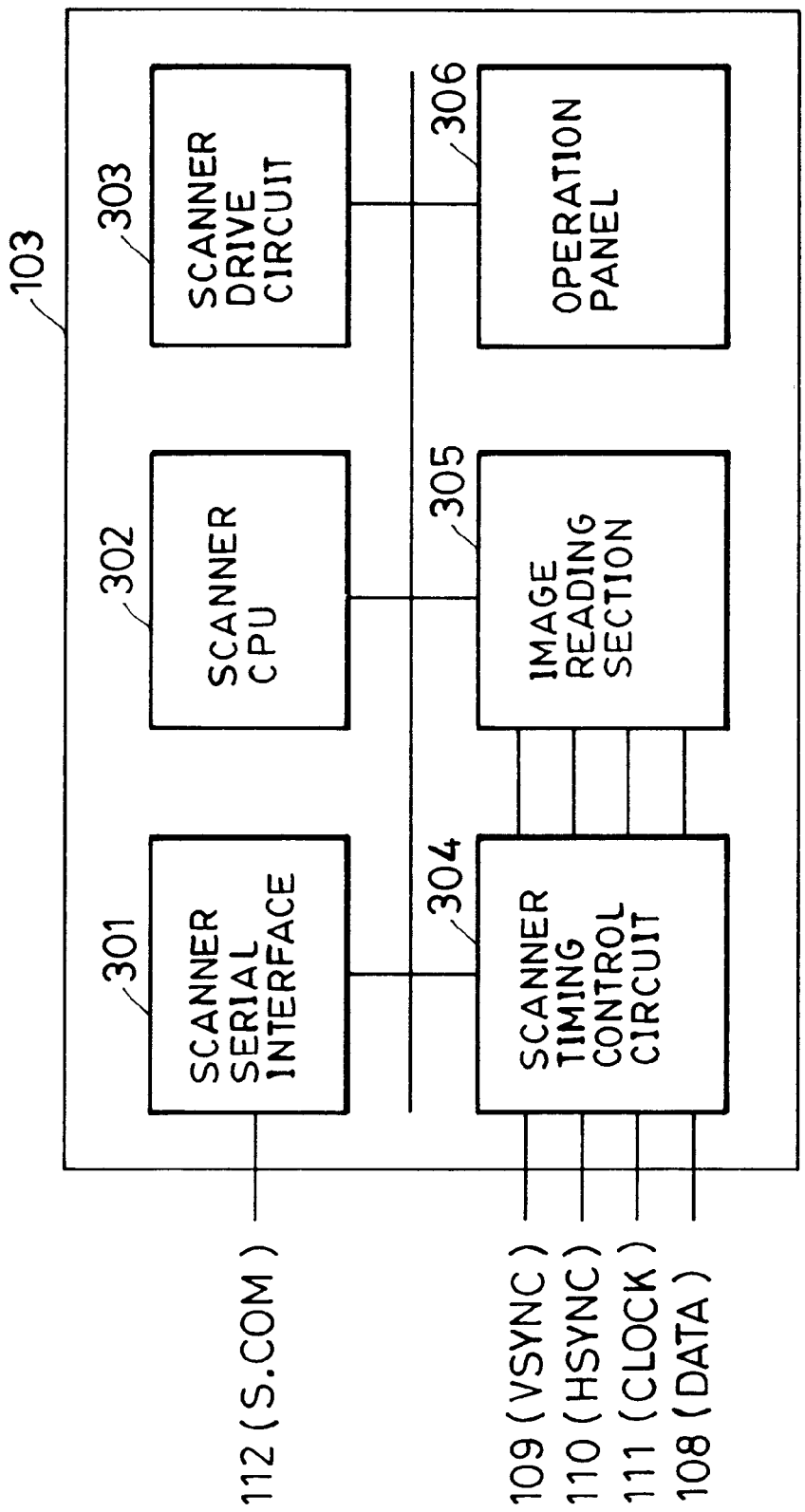
FIG. 3 is a structural view which illustrates a scanner.

FIG. 3 is a structural view which illustrates the scanner 103.

Reference numeral 301 represents a scanner serial interface, 302 represents a scanner CPU, 303 represents a scanner drive circuit, 304 represents a scanner timing control circuit, 305 represents an image reading section, and 306 represents an operation panel.

The operation to be performed in a case where an image is scanned will now be described with reference to FIG. 3.

The scanner serial interface 301 receives the scan command from the scanner printer server 102 so as to transmit the scan command to the scanner CPU 302.

Then, the scanner 302 sets the image size and the image scan start position in response to the scan command.

Figure 7:
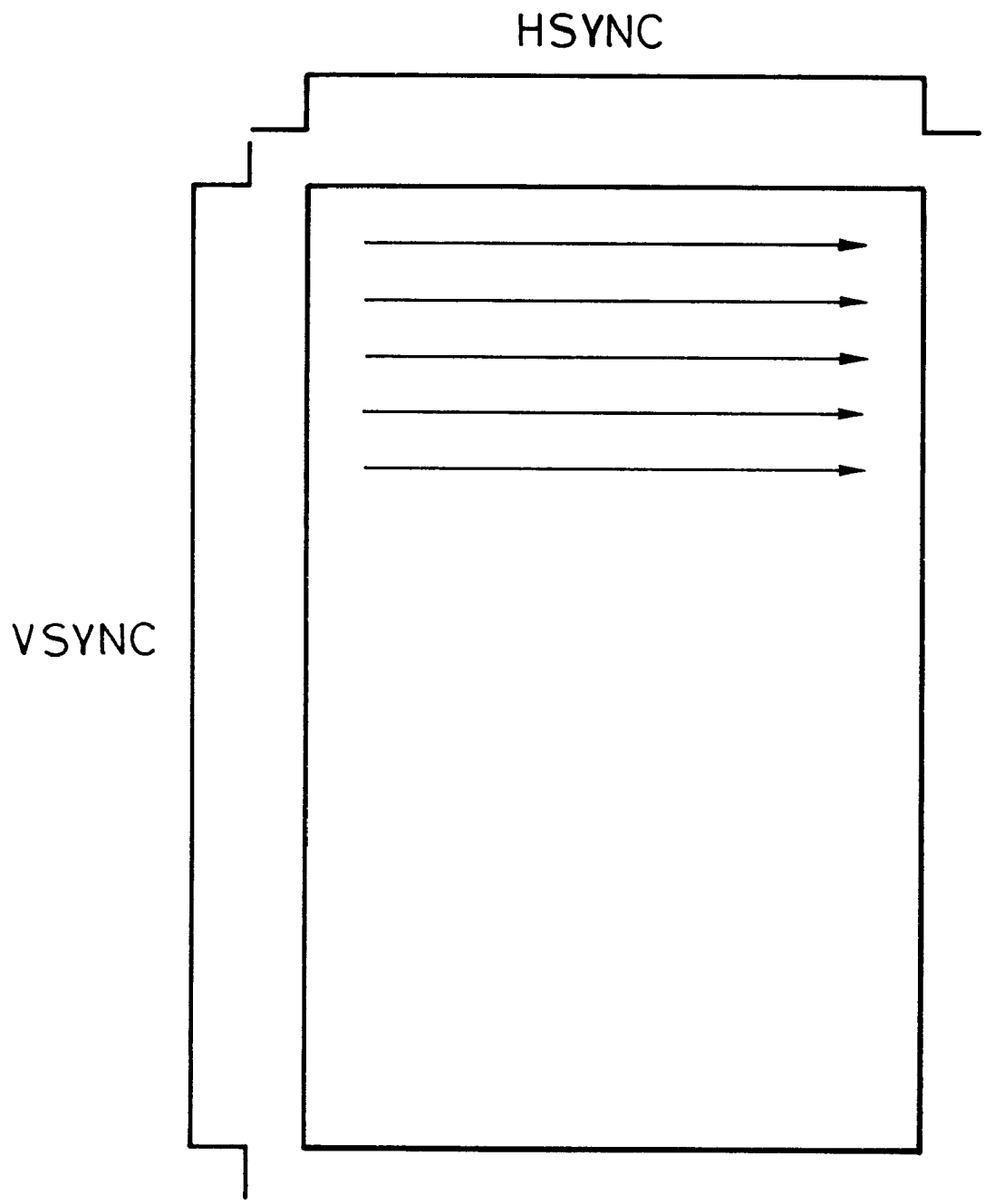
FIG. 7 illustrates the image scanning and printing operations.

The scanner CPU 302 controls the scanner drive circuit 303 to cause the image reading portion 305 to read the image for each line as shown in FIG. 7.

At this time, the scanner timing control circuit 304 transmits the HSYNC (the horizontal synchronizing signal) 110, the VSYNC (the vertical synchronizing signal) 109, the CLOCK (the clock signal) 111 and image data synchronized with it to the DATA (the image data signal) 108.

The scanner printer server 102 reads the image data in synchronization with the HSYNC (the horizontal synchronizing signal) 110, the VSYNC (the vertical synchronizing signal) 109 and the CLOCK (the clock signal) 111.

Figure 4:
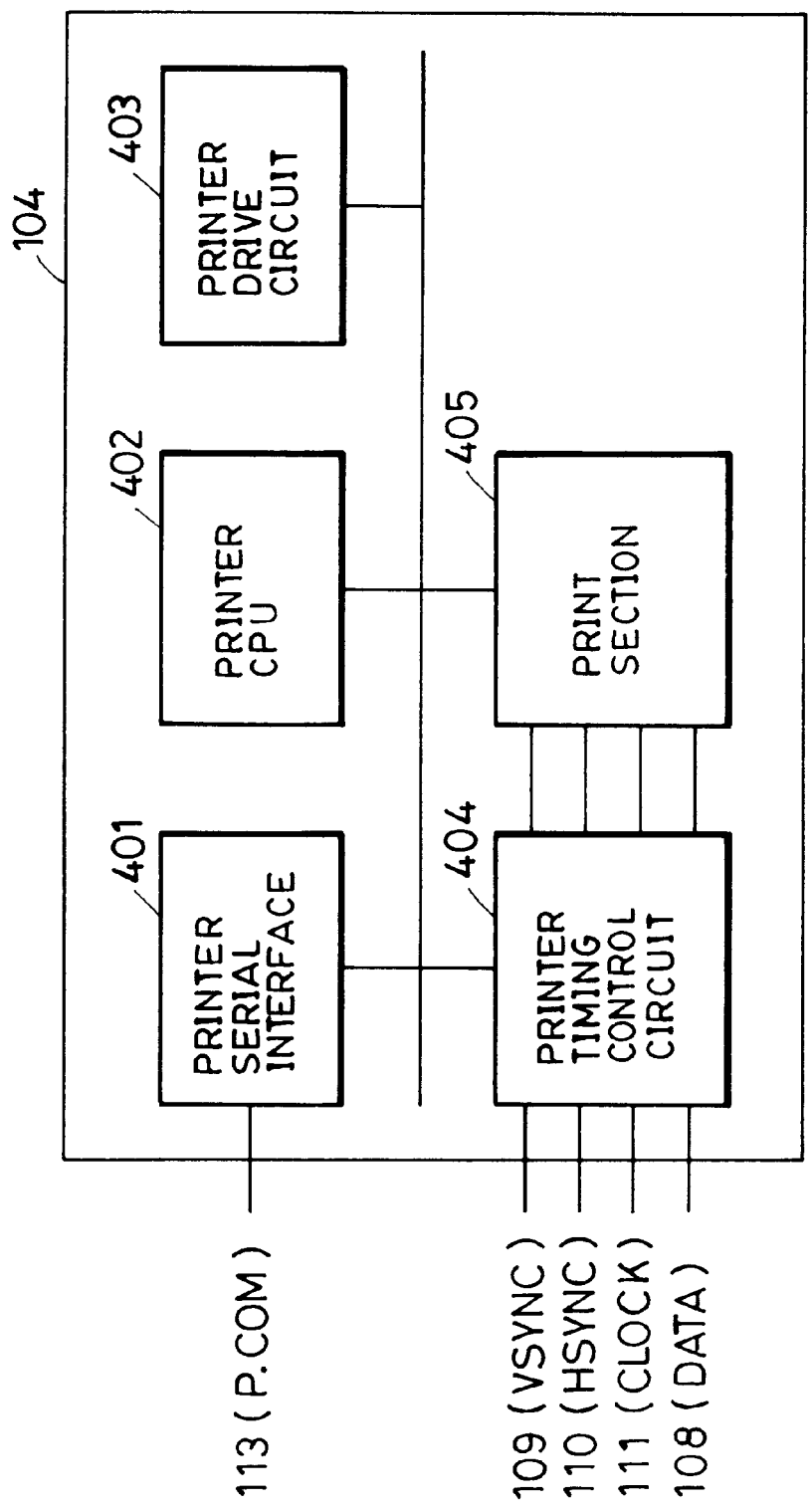
FIG. 4 is a structural view which illustrates a printer.

FIG. 4 is a structural view which illustrates the printer 104.

Reference numeral 401 represents a printer serial interface, 402 represents a printer CPU, 403 represents a printer drive circuit, 404 represents a printer timing control circuit, and 405 represents a printing section.

The operation to be performed when an image is printed will now be described with reference to FIG. 4.

The host computer 101 has data available, the data being required to be printed. The data is exemplified by data formed into raw image data, compressed image data, and page description language. Then, a printer whereby printing is performed is instructed and information about this is transmitted to the scanner printer server 102 via the network 105. If the client process 107 of the server 102 receives data formed into the page description language and the instructed printer does not have the function of bit-map developing the page description language, the client process 107 develops data in the server 102 and transmits the print command to the printer 104 via the interface to which the instructed printer is connected. If the connected printer does have the function of developing the page description language, the server 102 transmits data formed into the page description language to the printer 104.

The server 102 subjects the transmitted data to a process to be performed therein in accordance with the relationship between the transmitted data and the functions included by the instructed printer.

In a case where a function included by the instructed printer is used, the server 102 acts only to transfer the data. Then, the description will be made about a case where the printer connected to the server 102 does not include such a function. The printer serial interface 401 receives the print command from the scanner printer server 102 and transmits it to the printer CPU 402.

Then, the printer CPU 402 sets the size of the image and the position at which printing of the image is started in accordance with information transmitted together with the print data or with the instruction in the case of the page description language.

The printer CPU 402 controls the printer drive circuit 403 so as to read the image for each line as shown in FIG. 7.

Figure 8:
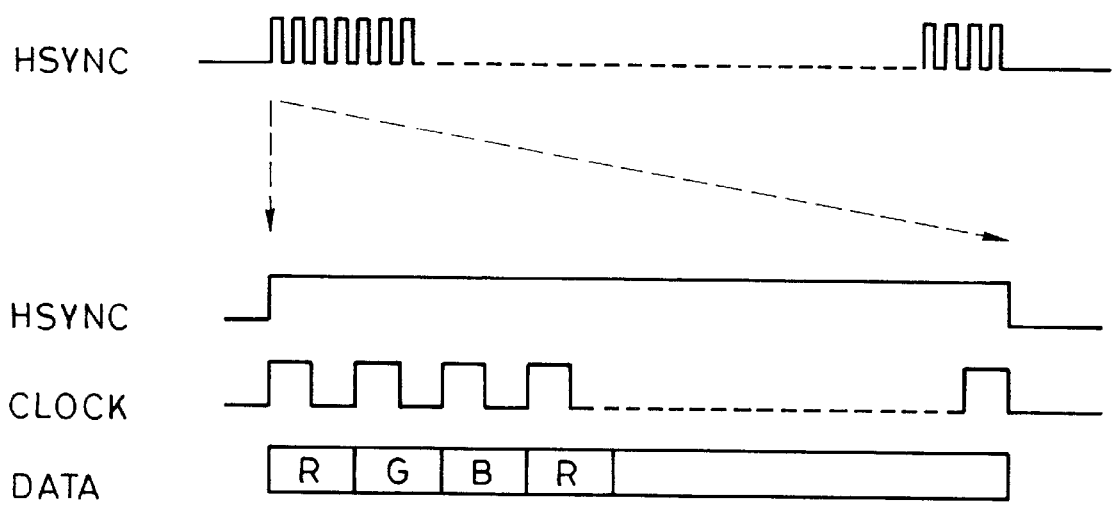
FIG. 8 illustrates timing in detail.

At this time, the scanner printer 102 transmits the HSYNC (the horizontal synchronizing signal) 110, the VSYNC (the vertical synchronizing signal) 109, the CLOCK (the clock signal) 211 and image data in synchronization with the aforesaid signals as shown in FIG. 8.

The printer timing circuit 404 receives the image data in synchronization with the HSYNC (the horizontal synchronizing signal) 110, the VSYNC (the vertical synchronizing signal) 109 and the CLOCK (the clock signal) 111 supplied from the scanner printer server 102 so as to cause the printer portion 405 to print it.

Figure 5:
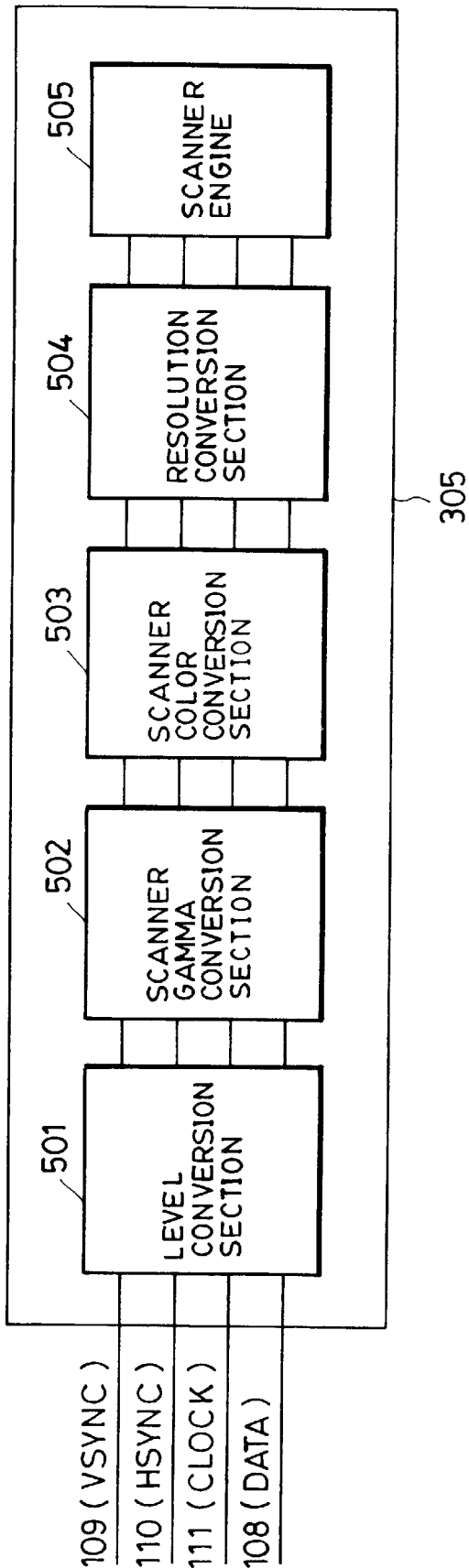
FIG. 5 is a structural view which illustrates an image reading section 305.

FIG. 5 is a structural view which illustrates the image reading section 305 having no compression function and arranged to transmit the raw image data.

Referring to FIG. 5, reference numeral 501 represents a level conversion section, 502 represents a scanner gamma conversion section, 503 represents a scanner color conversion section, 504 represents a resolution conversion section, and 505 represents a scan engine.

Referring to FIG. 5, the image reading section 305 is composed of the level conversion section 501, the scanner gamma section 502, the scanner color conversion section 503, the resolution conversion section 504, the scan conversion section 505 and the scan engine 505, which are respectively connected to a bus (omitted from illustration), so that parameters from the scanner CPU 302 can be converted.

The scan engine 505 reads an RGB color image, performs a shading correction, and transmits image data.

The resolution conversion section 504 converts the resolution of reading the image, the resolution being able to be selected from a group consisting of 400 dpi (dot per inch), 200 dpi, 100 dpi and the like and instructed by the scanner CPU 302.

The scanner color conversion section 503 converts the color of the image. If the required image data is RGB data of the standard color space data, a suitable correction is selected and performed so as to be transmitted. Furthermore, conversion of the RGB color data into, for example, a YCrCb color space data is performed in the scanner color conversion section 503. In a case where white and black data is required, yellow data is used, which is the brightness data of the aforesaid YCrCb, or else green data, which is the intermediate wavelength data of the RGB color data, is used so as to perform the white and black conversion. The scanner color conversion is instructed by the scanner CPU 302.

In the level conversion section 501, the number of effective bits for one pixel is converted. For example, the lower bit of YCrCb composed of 8 bits for each color and subjected to the gamma conversion is omitted and the dynamic range s so converted that Y is made to be 6 bits and each of Cr and Cr is made to be 4 bits. The aforesaid level instruction is performed by the scanner CPU 302 in accordance with an instruction issued by the host computer 101.

Figure 6:
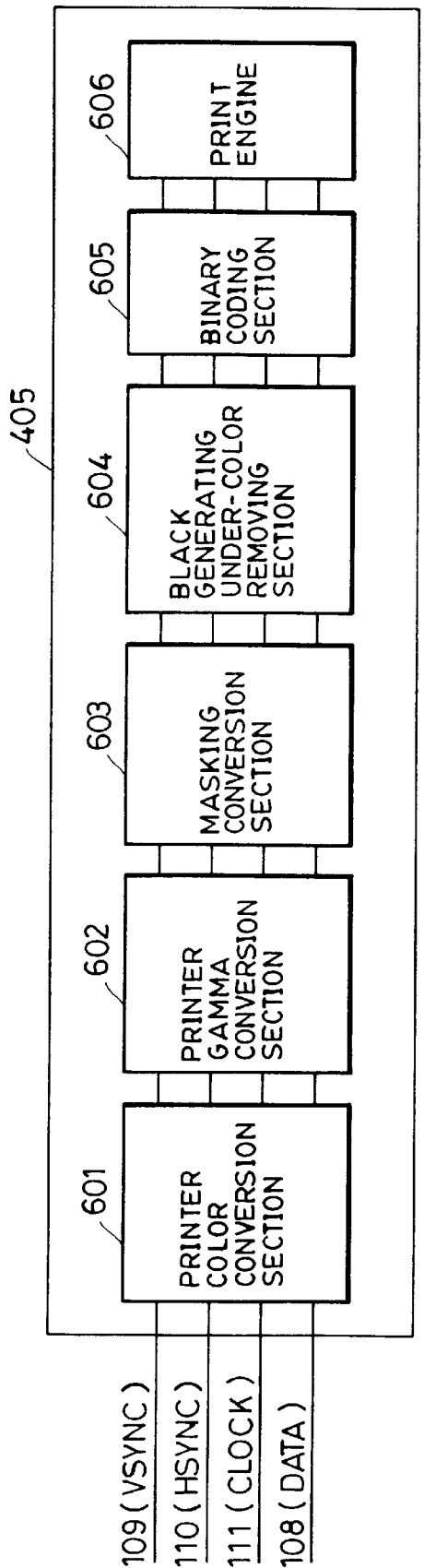
FIG. 6 is a structural view which illustrates a printing section 405.

FIG. 6 is a structural view which illustrates the printing section 405.

Reference numeral 601 represents a printer color conversion section, 602 represents a printer gamma conversion section, 603 represents a masking conversion section, 604 represents a black generating/base color removing section, 605 represents a binary coding section, and 606 represents a print engine.

The printer color conversion section 601 converts the image into RGH system. In a case where the image formed into, for example, a color space of YCrCB, has been supplied, it is converted into the RGB system.

The printer gamma conversion section gamma-converts the supplied image by a known function:

R'=f (R)
G'=f (G)
B'=f (B)

The aforesaid conversion is performed by using an LUT (Look Up Table), the LUT being set by the printer CPU 402.

The masking conversion section 603 converts masking for the supplied image.

The aforesaid masking conversion can he obtained by a known primary conversion arranged as follows:

$$(R'', G'', B'') = \begin{pmatrix} a11 & a12 & a13 \\ a21 & a22 & a23 \\ a31 & a32 & a33 \end{pmatrix} \begin{pmatrix} R' \\ G' \\ B' \end{pmatrix}$$

or a known secondary conversion arranged as follows:

$$(R'', G'', B'') = \begin{pmatrix} a11 & a12 & a13 & a14 & a15 & a16 & a17 \\ a21 & a22 & a23 & a24 & a25 & a26 & a27 \\ a31 & a32 & a33 & a34 & a35 & a36 & a37 \end{pmatrix} \begin{pmatrix} R' \\ G' \\ B' \\ R' * R' \\ G' * G' \\ B' * B' \\ 1 \end{pmatrix}$$

The aforeoaid conversion is performed by the LUT (Look Up Table) or a gate array. The parameter of the aforesaid LUT or the gate array is set by the printer CPU 402.

In the black generating/base color removing section 604, the black color generation and the base color removal are performed as follows:

C=255-R"
M=255-G"
Y=255-B"
Bk=a (min (C, M, Y)
C'=C-Bk
M'=M-Bk
Y'=Y-Bk

The aforesaid conversion is performed by the LUT (Look Up Table) or a gate array. The parameter of the aforesaid LUT or the gate array is set by the printer CPU 402.

In the binary coding section 605, the image is binary-coded if the print engine 606 is a binary printer. In order to perform the binary coding operation, a simple binary coding method, a dither method and an error diffusion method are changed over. Incidentally, the binary coding section 605 can be omitted from the structure if the print engine 606 is a multi-value printer. The aforesaid conversion is performed by the gate array. The binary coding method and the threshold for the binary coding operation, and the like are performed by the printer CPU 402.

FIG. 7 illustrates a scanning and printing operation, where reference numeral 701 represents an image to be scanned or printed.

Symbol VSYNC represents a vertical synchronizing signal and HSYNC represents a horizontal synchronizing signal. The image 701 to be scanned or printed is transmitted for each line thereof in synchronization with the vertical synchronizing signal and the horizontal synchronizing signal.

FIG. 8 illustrates the timing, where symbol VSYNC represents the vertical synchronizing signal, HSYNC represents the horizontal synchronizing signal, and CLOCK represents a standard clock. Image data is transmitted for each pixel in synchronization with the CLOCK.

Although the embodiment shown in FIG. 8 is adapted for the ROB color data, the scanner color conversion section 503 is able to convert the color into an arbitrary group of three primary colors.

Figure 9:
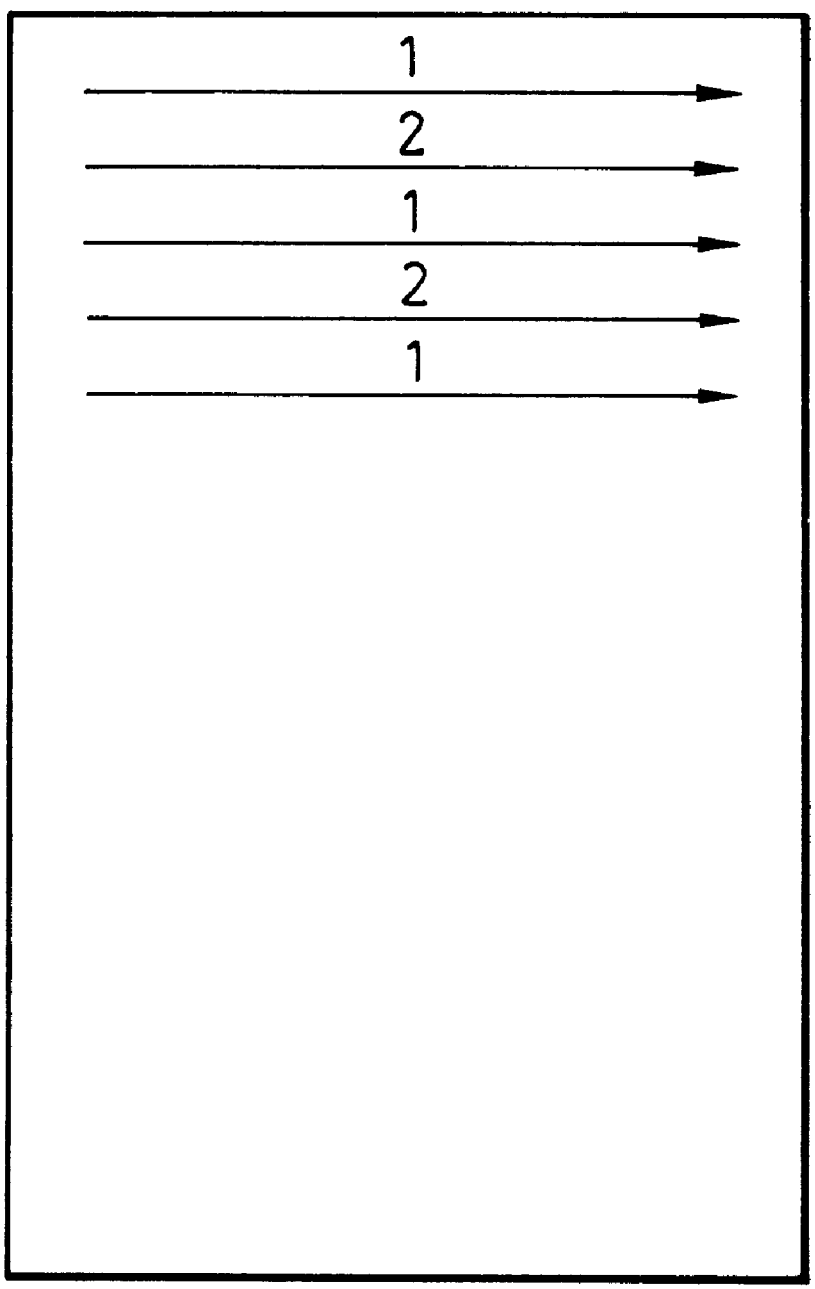
FIG. 9 illustrates the operation of a dual port ram at the time of the scanning and the printing operations.

FIG. 9 illustrates the operation of the dual port ram at the time of the pre-scanning operation or the printing operation. As shown in FIG. 9, the image for each line is read by the scanner 103 from the dual port ram or the same is written to the printer 104 from the dual port ram at the time of the scanning or the printing operation.

The numbers shown in FIG. 9 denote the accessing order performed by the dual port ram at this time.

Figure 10:
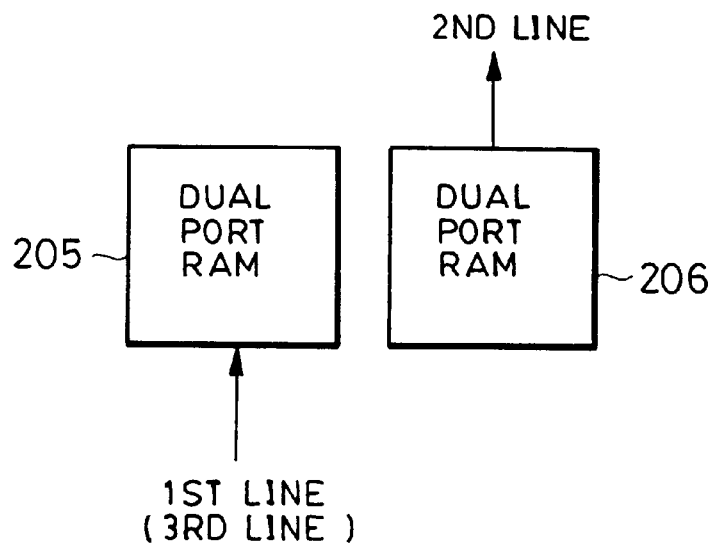
FIG. 10 illustrates the operation of the dual port ram at the time of the scanning operation.
Figure 11:
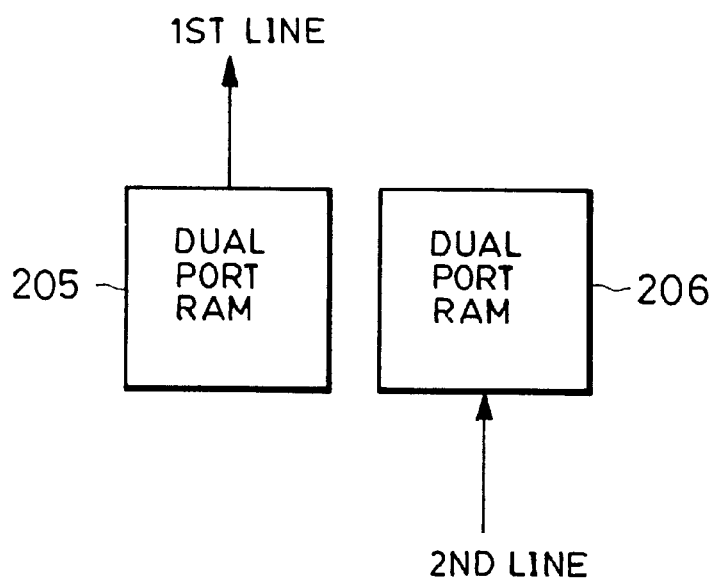
FIG. 11 illustrates the operation of the dual port ram at the time of the scanning operation.

FIGS. 10 and 11 illustrate the operation of the dual port ram at the time of the pre-scanning operation.

When an image is read by the scanner 103, the scanner printer server 102 alternately writes image data to the dual port ram for each line as shown in FIGS. 10 and 11. That is, the first line is read by the scanner 103 so as to be written to the dual port ram 205 as shown in FIG. 10.

Then, the second line is read by the scanner 103 as shown in FIG. 11 so as to be written to the dual port ram 206. If the host computer 101 requires raw image data, data in the dual port ram is read as is so as to be transferred to the server process 107 via the ethernet 105. If the host computer 101 requires data formed into compressed image data, the encoding circuit 213 included in the server device shown in FIG. 2 is utilized to read data in the dual port ram 205, the data being then image-compressed so as to be transferred to the server process 107 via the ethernet 105.

Then, the third line is read from the scanner 103 as shown in FIG. 10 so as to be written to the dual port ram 205. Simultaneously, data about the second line stored in the dual port ram 206 is read so as to be transferred to the server process 107 via the ethernet 105 in the form of the raw image data or the compressed image data.

Then, the image is read for each line by utilizing the dual buffer.

Incidentally, the scan engine 505 reads the image by the RGB dot sequential method. If a user issues an instruction to read the image by another method such as the line sequential method or the plane sequential method, scan conversion must be performed, the scan conversion being performed at the time of reading the image from the dual port rams 205 and 206.

Then, the scan conversion operation to be performed at the time of scanning data will now be described.

An assumption is made that dot sequential RGB data is converted into, for example, a YCrCb color space by the scanner color conversion section 503, and it is alternately written to the dual port rams 205 and 206 by the dot sequential method.

In order to convert the dot sequential YCrCb image into the line sequential data before it is transferred, the image data is so read that it is shifted by a degree corresponding to three pixels.

That is, only Y, which is the first color, is read from the dot sequential YCrCb image, and Y is transferred. Then, only Cr, which is the second color, is read and transferred. Finally, only Cb, which is the third color, is read and transferred. As a result, scanning conversion from the dot sequential YCrCb to the line sequential YCrCb image is performed.

Then, an operation in which the dot sequential YCrCb image is converted to the plane sequential YCrCb so as to be transferred will now be described.

Similarly to the line sequential operation, the scanner color conversion section 503 converts the dot sequential RGB into, for example, a YCrCb color space so as to be alternately written to the dual port rams 205 and 206 by the dot sequential method.

Since the conversion from the dot sequential form the plane sequential form cannot be completed by a single scanning operation, scanning is performed three times by the scan engine 505.

At the time of the first scanning operation, only the first color Y is read and transferred, only Cr is read at the second scanning operation, and only Cb is read at the third scanning operation so as to be transferred. As a result, the dot sequential YCrCb image can be converted into the plane sequential YCrCb image.

In a case of the dot sequential YCrCb image, the image can be encoded by the ADCT method. Also in this case, the image read by the scanner 103 is alternately written to the dual port ram, and the same is, by the encoding/decoding circuit 213, encoded at the time of the reading operation, the encoded image data being then written to the RAM 203. The encoded image data is then transferred to the server process 107 via the ethernet 105.

As a result, the image to be transferred can be compressed and therefore the quantity to be communicated can be reduced.

Figure 12:
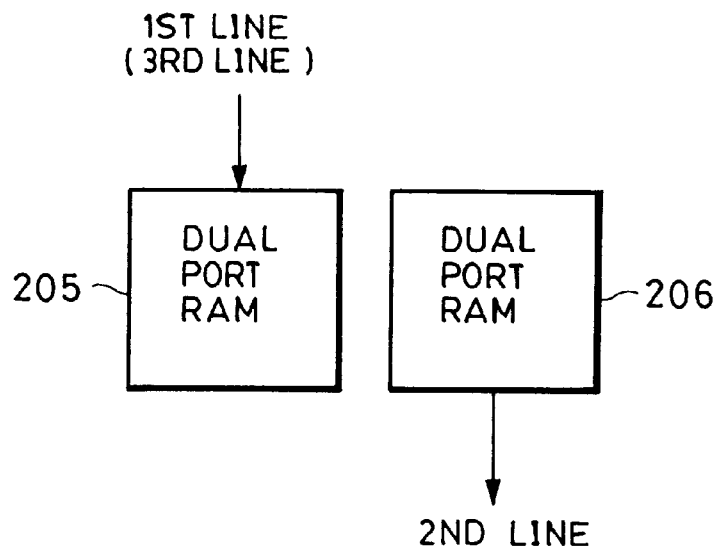
FIG. 12 illustrates the operation of the dual port ram at the time of the printing operation.
Figure 13:
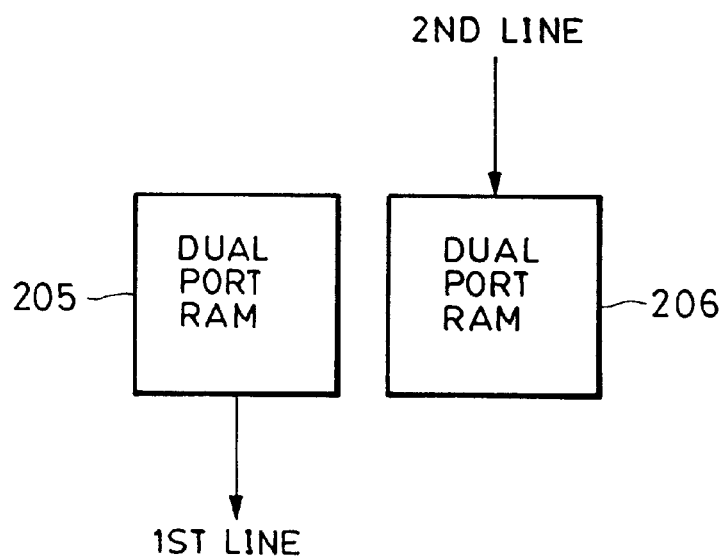
FIG. 13 illustrates the operation of the dual port ram at the time of the printing operation.

FIGS. 12 and 13 illustrate the operation of the dual port ram at the time of the printing operation.

In a case where an image is printed by the printer 104, the scanner printer server 102 transmits data from the dual port ram for each line to the printer 104 as shown in FIGS. 12 and 13.

That is, the first line is read from the ethernet 105 as shown in FIG. 12 so as to be written to the dual port ram 205.

Then, the second line is, as shown in FIG. 13, read from the ethernet 105 so as to be written to the dual port ram 206. Simultaneously, data in the dual port ram 205 is read so as to be transferred to the printer 104.

Then, the third line is, as shown in FIG. 12, read from the ethernet 105 so as to be written to the dual port ram 205. Simultaneously, data is read from the dual port ram 206 so as to be transferred to the printer 104.

Then, the image is similarly transferred for each line by utilizing the dual buffer.

Incidentally, the printer engine 606 prints an image by the RGB dot sequential manner. Therefore, if the user inputs an instruction to print the image in another form, for example, the line sequential form or the plane sequential form, scan conversion must be performed. The aforesaid conversion is performed at the time of reading the image from the dual port rams 205 and 206.

Then, the scan conversion to be performed at the time of the printing operation will now be described.

In a case where dot sequential YCrCb image data is transferred from the server process 107, the scan conversion can be omitted. The dot sequential YCrCb image data is transferred to the printer 104, and it is then converted into dot sequential RGB by the printer color conversion section 601 so as to be printed.

In a case where line sequential YCrCb image data is transferred, it is read for each image at the time of reading the image data. That is, the first color Y of the first pixel, the second color Cr of the first pixel, and the third color Cb of the first pixel are read in the aforesaid sequential order. Then, the first color Y of the second pixel, the second color Cr of the second pixel, and the third color Cb of the second pixel are read in the aforesaid sequential order. Then, colors are similarly read, so that the line sequential YCrCb image can be converted into the dot sequential YCrCb image.

The dot sequential YCrCb image data is transferred to the printer 104, and it is converted into dot sequential RGB data by the printer color conversion section 601 so as to be printed.

Then, the scan conversion to be performed in a case where the plane sequential YCrCb image has been transferred will now be described.

Since conversion from the plane sequential YCrCb image to the dot sequential YCrCb image cannot be completed by one reading, image data is temporarily stored in the hard disk 212.

Then, the film stored in the hard disk 212 is sought so as to be read in the dot sequential YCrCb manner before it is written to the dual port rams 205 and 206. Thus, the scan conversion is performed. The dot sequential YCrCb imago data is transferred to the printer 104 so as to be converted into dot sequential RGB data by the printer color conversion section 601 before it is printed.

In a case where a dot sequential YCrCb image encoded by the ADCT method has been transferred, it is decoded to a dot sequential YCrCb image by the encoding/decoding circuit 213. The dot sequential YCrCb image is alternately written to the dual port rams 205 and 206 for each line before it is transferred to the printer 104.

As a result, an image can be compressed when it is transferred, and therefore the quantity to be communicated can be reduced.

Figure 14:
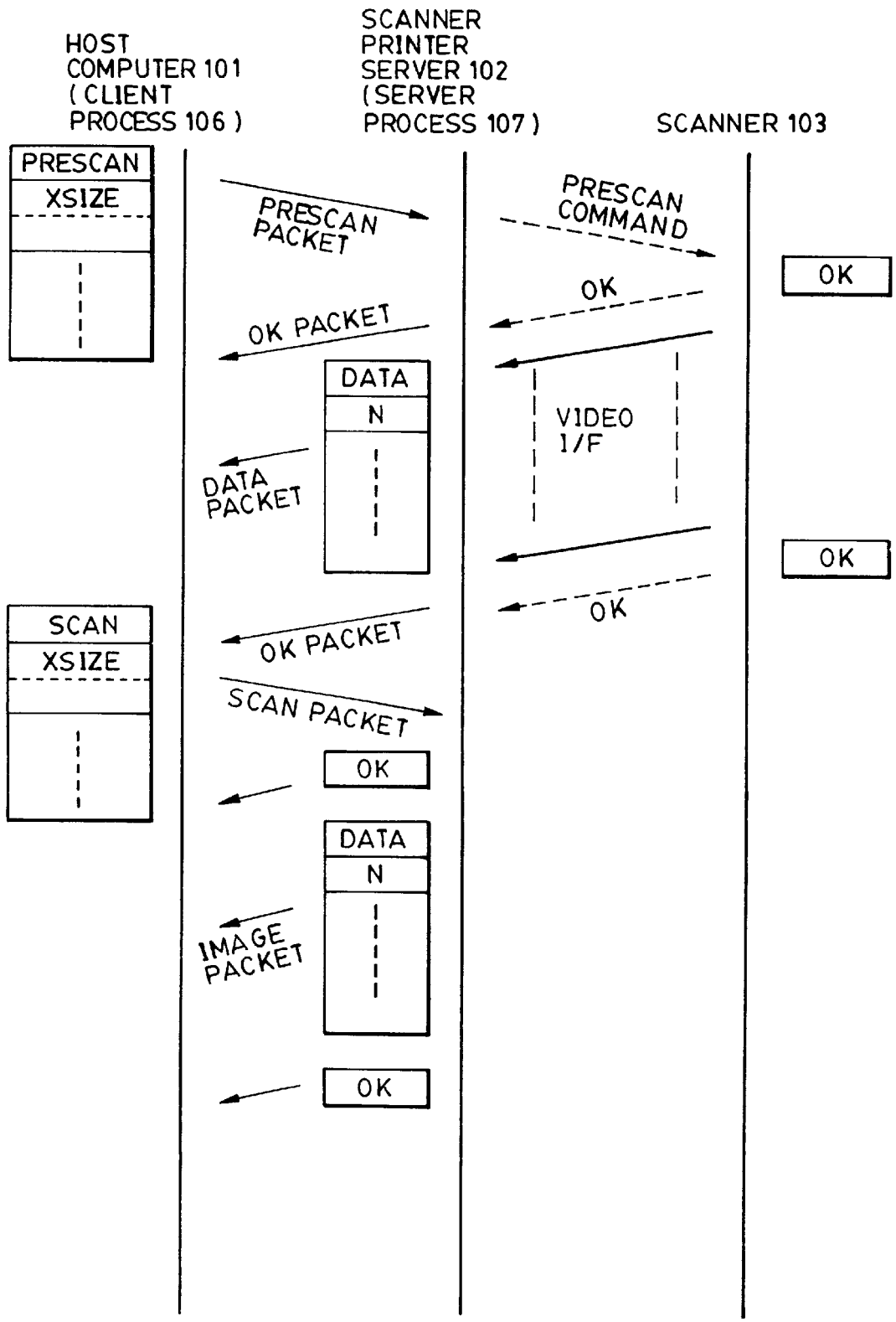
FIG. 14 illustrates the pre-scanning and scanning operations.

FIG. 14 illustrates the operation to be performed at the time of the pre-scanning and the scanning operations. Then, the operation of communicating data between the host computer 101 and the scanner printer server 102 and the scanner 103 to be performed at the time of the pre-scanning operation and the scanning operation will now be described with reference to the drawings.

In a case where an image is read from the scanner 103, it is necessary to instruct the size of the image, the position of the image, the resolution, the format (dot sequential, line sequential, or plane sequential), the edge emphasis, the color space (RGB and YCrCb), the color (the color to be transferred, for example, only G is transferred), the level (the number of gradations of the color), the encoding method (the ADCT method, encoding is omitted or the like), the bit rate (the bit rate at the time of the encoding operation), the thinning rate at the time of the pr(e-scanning operation, the file to which data is read and the like.

Therefore, the client process 106 instructs the user to instruct the aforesaid parameters. The user then instructs the parameters and executes the pre-scanning operation.

Then, the client process communicates with the server process 107 in accordance with a sequence shown in FIG. 14.

Referring to FIG. 14, the client process 106 transmits a PRESCAN packet to the server process 107, the PRESCAN packet being composed of the XSIZE, YSIZE, XSTART, YSTART, XSTEP, and YSTEP, and the like.

In the server process 107, the image is encoded and thinning is performed at the time of the pre-scanning operation, and the encoding method, the bit rate at the time of the encoding operation and the thinning rate are set after it has received the PRESCAN packet. The other information is, as the prescan command, transferred from the serial interface 207 to the scanner 103.

The scanner 103 sets the parameters to the image reading section 305 in accordance with information about the prescan command. If the aforesaid parameters are correctly set, OK is returned to the server process 107.

When the server process 107 has received OK from the scanner 103, it returns an OK packet to the client process 106. If it has not been set correctly, status information is returned to the server process 107.

When the scanner 103 has received the pre-scan command, it reads an image from the Video I/F for each line.

At the time of the pre-scanning operation, the timing control circuit 208 of the scanner printer server 102 makes the HSYNC (the horizontal synchronizing signal) 110, the VSYNC (the vertical synchronizing signal) 109, the CLOCK (the clock signal) 111, and the DATA (the image data signal) 108 to be high impedance. Furthermore, it reads data from the DATA (the image data signal) 108 in synchronization with the HSYNC (the horizontal synchronizing signal) 110, the VSYNC (the vertical synchronizing signal) 109 and the CLOCK (the clock signal) 111 so as to write the data to the dual port rams 205 and 206.

The server process 107 reads the image data, which has been read from the Video I/F for each line, from the dual port rams 205 and 206 so as to write the image data to the hard disk 212.

At this time, the image is thinned in accordance with the thinning ratio of the XSTEP and YSTEP instructed with thee PRESCAN packet. The data about this is divided into sections each having a suitable size or combined with each other so that a plurality of DATA packets are formed, each of which is composed of a DATA tag, the number of bytes of the packet and image data, the DATA packets being then transferred to the client process 106 of the host computer 101.

In the client process 106 of the host computer 101, the thinned image data is picked up from the image packet supplied from the server process 107 so as to be displayed on a CRT.

When the scanner 103 has correctly transmitted all of the images, it transmits OK through the scanner serial interface 301 to the server process 107. When the server process 107 has received OK from the scanner 103, it transmits an OK packet to the client process 106.

When the server process 107 has transmitted the OK packet to the client process 106, it waits for the next command packet to be supplied from the client process 106.

The client process 106 receives all of the thinned images, displays them on the CRT, and inquires of the user which region of the image is to be actually scanned. The user uses a poanting device such as a mouse to instruct the region to be actually scanned. Furthermore, it instructs the scan start to the client process 106.

Then, the client process 106 transmits a SCAN packet composed of the XSIZE, YSIZE, XSTART and YSTART of the image to the server process 107.

When the server process 107 receives the SCAN packet, it transmits OK to the client process 106 if information about this has been correctly set.

The server process 107 reads image data, which has been read to the hard disk 212 at the time of the pre-scanning operation, in accordance with the parameters instructed with the SCAN packet. The data about this is divided into sections each having a suitable size or combined with each other so that a plurality of DATA packets are formed, each of which is composed of a DATA tag, the number of bytes of the packet and image data, the DATA packets being then transferred to the client process 106 of the host computer 101.

In the client process 106 of the host computer 101, the image data supplied from the server process 107 is fetched so as to be sequentially written to the disk.

When the server process 107 has correctly transmitted all of the images, it transmits an OK packet to the client process 106.

When the server process 107 has transmitted the OK packet to the client process 106, it waits for the next command packet to be supplied from the client.

When the client process 106 has received the OK packet from the server process 107, it waits for a next command issued by the user.

Figure 15:
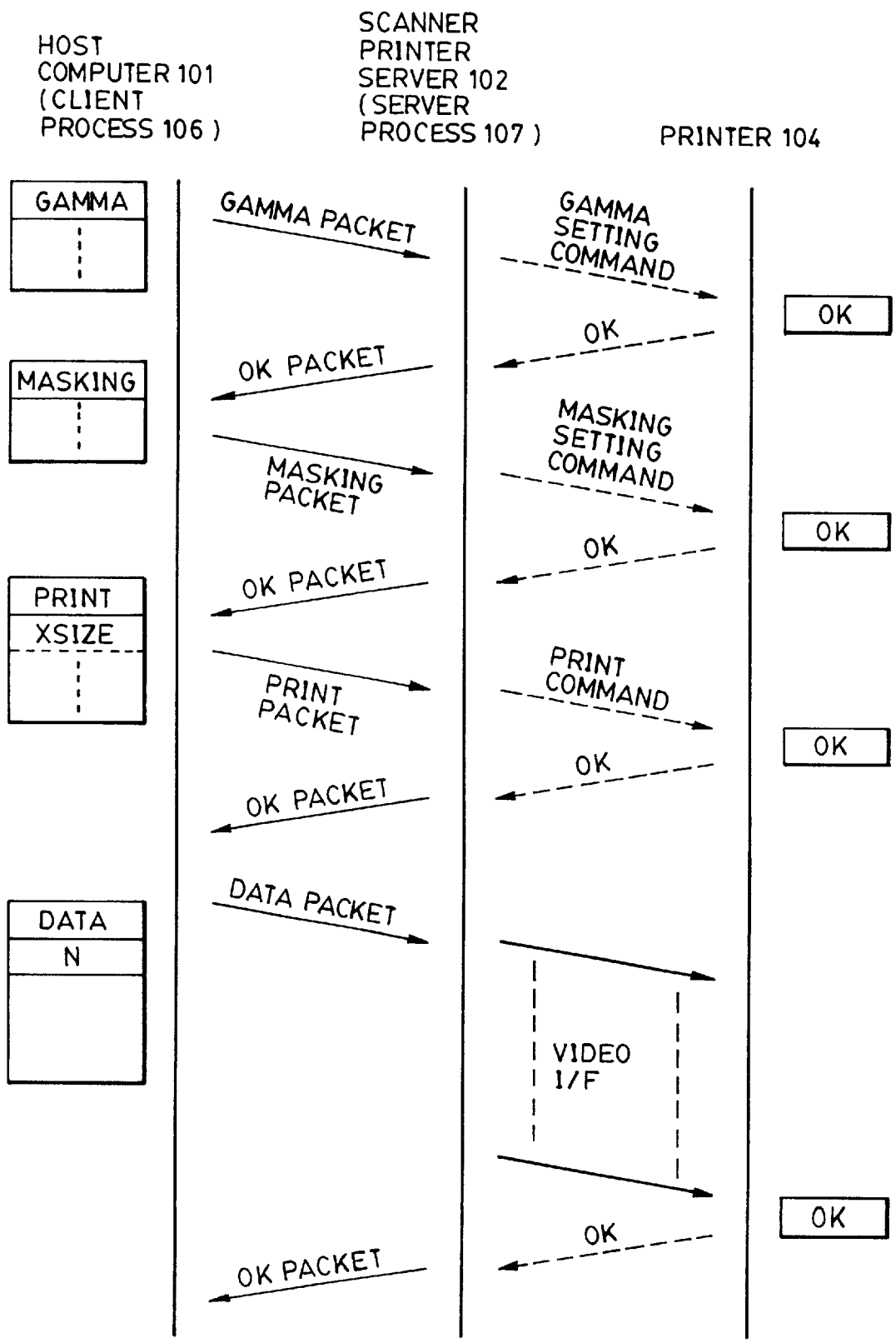
FIG. 15 illustrates the printing operation.

FIG. 15 illustrates the operation to be performed at the time of the printing operation. Then, the data communication between the client process 106 of the host computer 101, the scanner printer server 102 and the printer 104 to be performed at the time of the printing operation will now be described with reference to the drawings.

When a user wishes to process documents or pictures by utilizing desk top publishing software (hereinafter called "DTP software") with the host computer 101, to process data in the page description language form which is the output data form of the DTP software and print the data, or when the user wishes to print image data in the raw image data form or the compressed image form, an instruction is made to print image data in the page description language form or the image data form. Furthermore, if the image data is printed in the form of the image data form, the size of the image, the position of the image to be printed, and the file name for holding the image to be printed on the host computer 101 are instructed.

In the server process 107, the data form is discriminated and also the fact that a function in the instructed printer is used or a function in the scanner printer server 102 is used is discriminated.

Although default values for the parameters such as the gamma conversion, the masking conversion, and the like at the time of the printing operation are set, they may be changed.

In this case, the client process 106 shown in FIG. 15 transmits a GAMMA packet with the gamma table at the time of printing the image to the server process 107. If the gamma table has been set, the necessity of transmitting it can be omitted.

When the server process 107 receives the GAMMA packet, it transmits a gamma setting command to the printer 104 if the second byte of the GAMMA packet shows the printer. If the same shows the scanner, the server process transmits the gamma setting command to the scanner 103.

The printer 104 sets the LUT of the printer gamma conversion section 602 in accordance with the gamma setting command parameter. If it can be normally set, the printer 104 returns OK to the server process 101.

When the server process 107 has received the scanner OK, it returns an OK packet to the client process 106.

Then, the client process 106 transmits a MASKING packet with the masking table at the time of printing an image to the server process 107. If the masking table has been set, the necessity of transmitting it can be omitted.

When the server process 107 has received the MASKING packet, it transmits a masking setting command to the printer 104.

The printer 104 sets the parameter for the masking conversion section 603 in accordance with the masking setting command parameter. If it can be normally set, it returns OK to the server process 107.

When the server process 107 has received OK from the printer 104, it returns an OK packet to the client process 106.

When the parameters for the gamma conversion and the masking conversion have been set, the client process transmits to the server process 107 a PRINT packet including an instruction of print data in the page description language, the raw image form or the compressed image form, an instruction to a printer for use, and XSIZE, YSIZE, XSTART, YSTART and PAGE of the image.

When the server process 107 has received the PRINT packet, it starts establishing a connection to the instructed printer. If the printer does not have the page description language intepreting function and if data in the form of the page description language form has been received, processing is performed in the scanner printer server 102. If the same is the compressed data, a similar operation is performed.

The description will be made hereinafter about a case in which a printer which does not have the aforesaid function and which uses the Video I/F is used.

When the server process 107 has received the PRINT packet, it transmits the print command to the printer 104 through the serial interface 207.

If the print command has been correctly set, the printer 104 returns OK to the server process 107.

When the server process has received OK from the printer, it returns an OK packet to the client process 106.

When the client process 106 has received the OK packet, it reads image data (the page description language form, the raw image data form, and the compressed image data form and the like included) from an instructed file. The client process 106 divides the read image data into sections each having a suitable size or combined with each other so that a plurality of DATA packets are formed, each of which is composed of a DATA tag, the number of bytes of the packet and image data, the DATA packets being then transferred to the client process 107.

In the server process 107, image data is fetched from the image packet received from the client process 106 of the host computer 101. In a case where the image data is the page description language form, the page description language interpreter is started so as to perform the bit map development. In a case where the image data is in the compressed image data form, an extension process having an extension circuit is started so that the bit map development is performed. The data or raw image data, which has been developed in the bit map manner, is sequentially transferred to the printer 104 through the Video I/F so as to be printed.

At the time of the printing operation, the timing control circuit 208 of the scanner printer server 102 transmits HSYNC (the horizontal synchronizing signal) 110, the VSYNC (the vertical synchronizing signal) 19, the CLOCK (the clock signal) 111 and image data which synchronizes with it to the DATA (the image data signal) 108. The printer 104 reads data to be printed from the DATA (the image data signal) 108 in synchronization with it so as to print it.

When the printer 104 has normally printed all of the images, it transmits OK to the server process 107 from the print serial interface 401. When the server process 107 has received OK from the printer 104, it transmits an OK packet to the client process 106.

When the server process 107 has transmitted the OK packet to the client process 106, it waits for the next command packet supplied from the client. The client process 106 waits for the next command issued from the user when it has received the OK packet from the server process 107.

Figure 16:
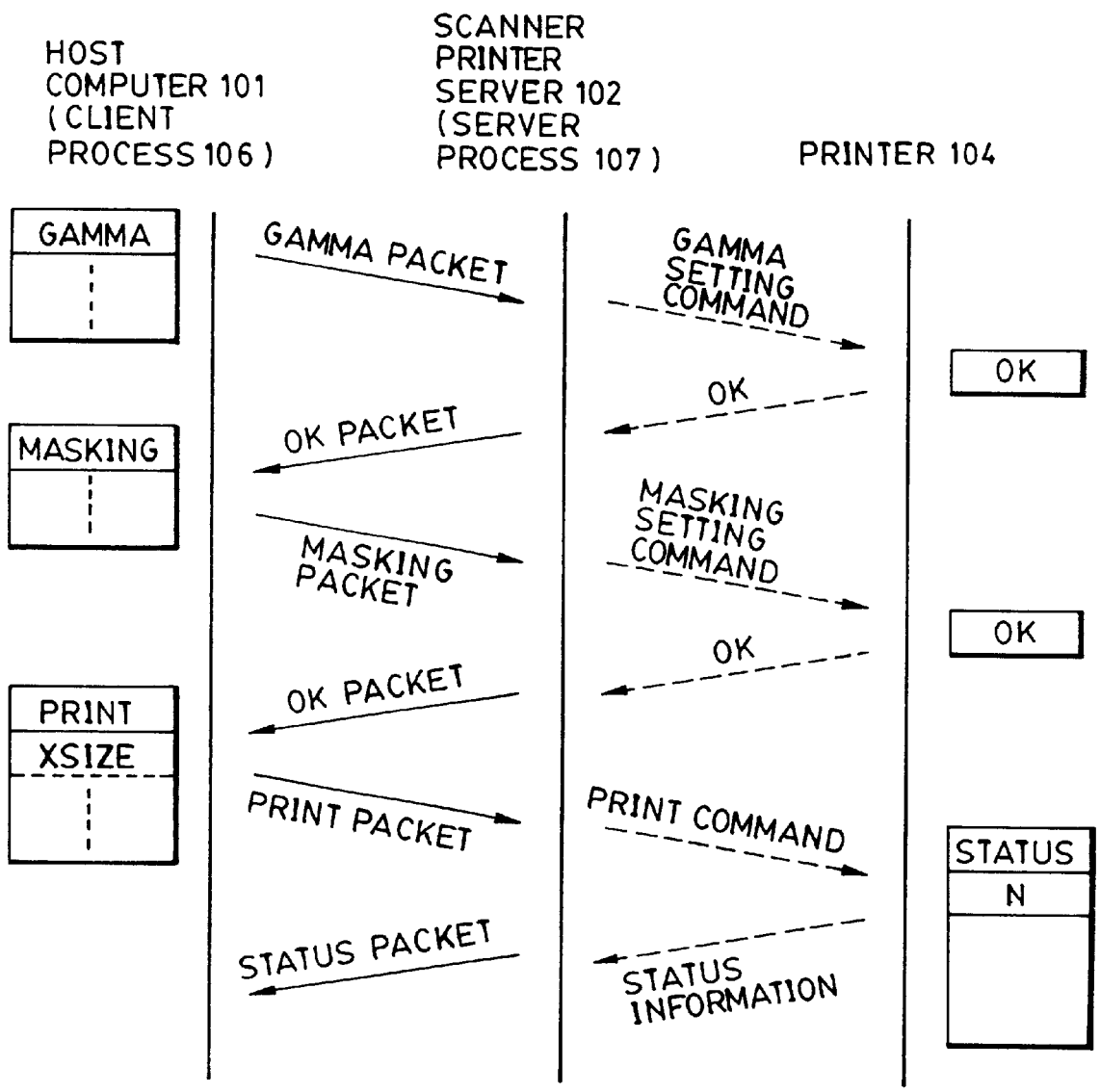
FIG. 16 illustrates a case where an error has taken place at the time of the printing operation.

FIG. 16 illustrates a case where an error has taken place at the time of the printing operation. Then, communication of data between the host computer 101 and the scanner printer server 102 and the printer 104 at the time of the printing operation will now be described with reference to the drawings.

Similarly to the aforesaid printing operation, the client process 106 sets a gamma table and a masking table for use in the image printing operation.

Then, the client process 106 transmits to the server process 107 a PRINT packet including an instruction to print data in the page description language, the raw image form or the compressed image form, an instruction of a printer for use, and XSIZE, YSIZE, XSTART, YSTART and PAGE of the image.

When the server process 107 has received the PRINT packet, it starts establishing a connection to the instructed printer. If the printer does not have the page description language intepreting function and if data in the form of the page description language form has been received, processing is performed in the scanner printer server 102. If the same is the compressed data, a similar operation is performed.

The description will be made hereinafter about a case in which a printer which does not have the aforesaid function and which uses the Video I/F is similarly used.

When the server process 107 has received the PRINT packet, it transmits the print command to the printer 104 through the serial interface 207.

If the value of the parameter of the print command is incorrect, or if a defect such that the value cannot be set has been taken place, or if an error such as paper out has been taken place, the printer 104 returns status information denoting the error status to the server process 107.

When the server process 107 has received the status information from the scanner, it converts the status information into a STATUS packet so as to return it to the client process 106.

When the client process 106 has received the STATUS packet, it transmits an adequate message to the user in accordance with the status so as to indicate that an error has taken place.

If an error such as paper jam has been taken place during the printing operation, the printer CPU 402 immediately interrupts the printing operation and transmits the error status information to the server process 107 through the printer serial interface 401.

When the server process 107 has received the status information from the printer 104, it transmits the aforesaid status information as a STATUS packet to the client process 106 and waits or the next command.

When the client process 106 has received the STATUS packet, it transmits an adequate message to the user in accordance with the status so as to indicate the occurrence of the error.

Figure 17:
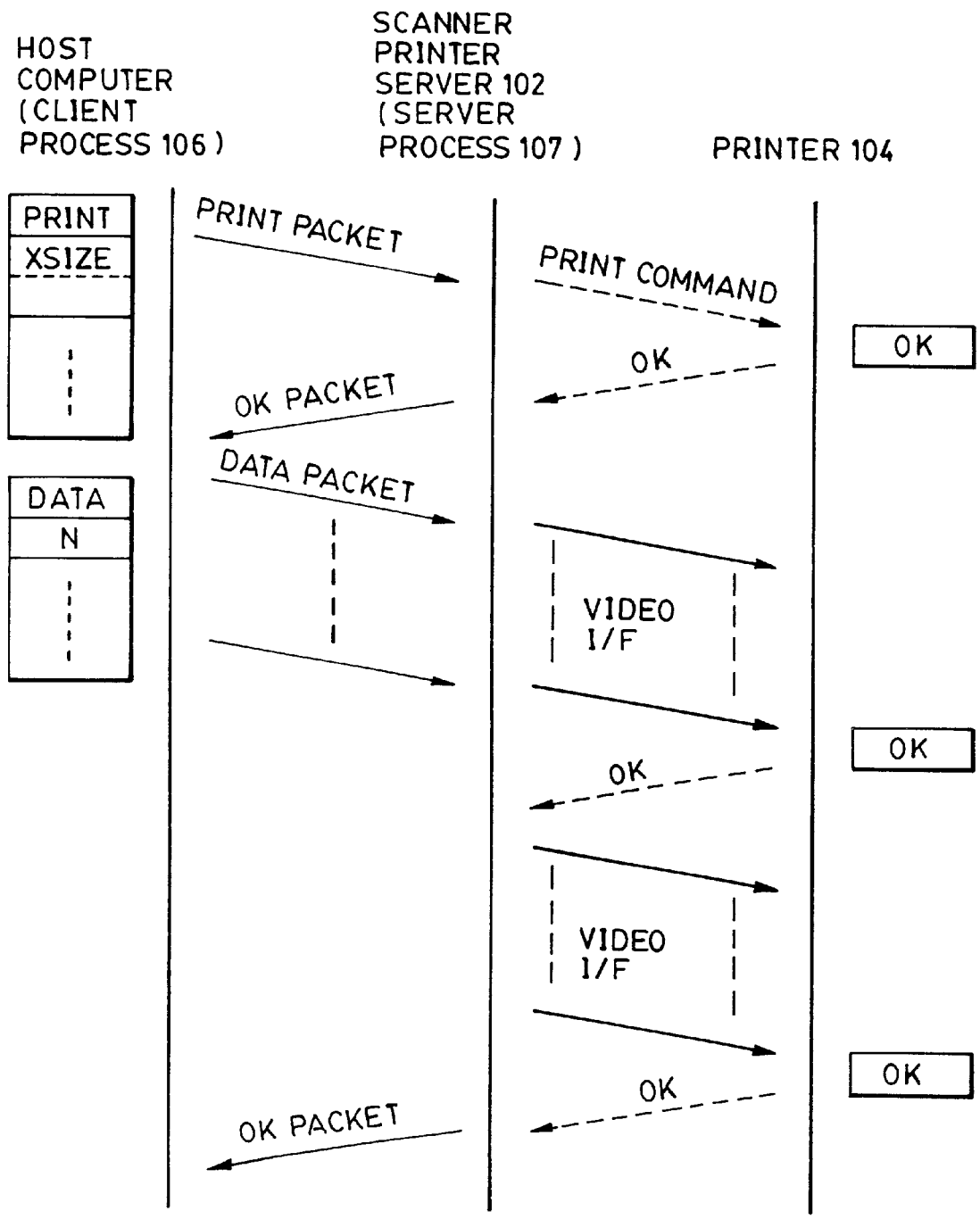
FIG. 17 illustrates the operation to be performed when a plurality of sheets of one image are printed.

FIG. 17 illustrates the operation to be performed in a case where a plurality of prints are made from the same image. Then, communication of data between the host computer 101, the scanner printer server 102 and the printer 104 to be performed at the time of the printing operation will now be described with reference to the drawing.

The user uses the host computer 101 to instruct the file name if the image to be printed is formed into the page description language. If the image is formed into the raw image data form or the compressed image data form, the user instructs the size, the position of the image to be printed, and the file name on the host computer 101 which stores the image to he printed. An assumption is made here that the gamma conversion parameter and the masking conversion parameter for use at the time of the printing operation have been set.

Referring to FIG. 17, the client process 106 transmits a PRINT packet including an instruction to print data in the page description language, the raw image form or the compressed image form, an instruction to a printer for use, XSIZE, YSIZE, XSTART, YSTART and PACE of the image, and PAGE which denotes the number of prints to be made to the server process 107.

When the server process 107 has received the PRINT packet, it starts establishing a connection to the instructed printor. if the printer does not have the page description language intepreting function and if data in the form of the page description language form has been received, the processing of developing the data to the page description language is performed in the scanner printer server 102. If the same is the compressed data, a similar operation is performed.

The description will be made hereinafter about a case in which a printer which does not have the aforesaid function and which uses the Video I/F is similarly used.

When the server process 107 has received the PRINT packet, it transmits the print command to the printer 104 through the serial interface 207.

If information about the print command has been set correctly, the printer 104 returns OK to the server process 107.

When the server process 107 has received OK from the scanner, it returns an OK packet to the client process 106.

When the client process 106 has received the OK packet, it reads the image from the instructed file. The client process 106 divides the read image data into sections each having a suitable size or combined with each other so that a plurality of DATA packets are formed, each of which is composed of a DATA tag, the number of bytes of the packet and image data, the DATA packets being then transferred to the server process 107.

In the server process 107, image data is fetched from the image packet received from the client process 106 of the host computer 101. In a case where the image data is in the page description language form, the page description language interpreter is started so as to perform the bit map development. In a case where the image data is in the compressed image data form, an extension process having an extension circuit is started so that the bit map development is performed. The data or raw image data, which has been developed in the bit map manner, is sequentially transferred to the printer 104 through the Video I/F so as to be printed. Simultaneously, the image data is stored in the hard disk 212.

When the printer has normally printed the first image, it transmits OK to the server process 107 through the printer serial interface 401.

When the server process 107 has received OK from the printer 104, it reads an image for the second and ensuing images, which have been written, from the hard disk 212, so that the images are sequentially printed by the printer 104 via the Video I/F.

When the number of pages instructed with the PRINT packet has been printed, the server process 107 transmits an OK packet to the client process 106 so as to indicate the fact that the printing operation has been performed normally. Furthermore, the stored image is deleted.

When the server process 107 has transmitted the OK packet to the client process 106, it waits for the next command packet to be supplied from the client.

When the client process 106 has transmitted all of the images and has received the OK packet from the server process 107, it waits for the command to be issued from the user.

Then, another embodiment of the present invention will now be described.

Figure 21:
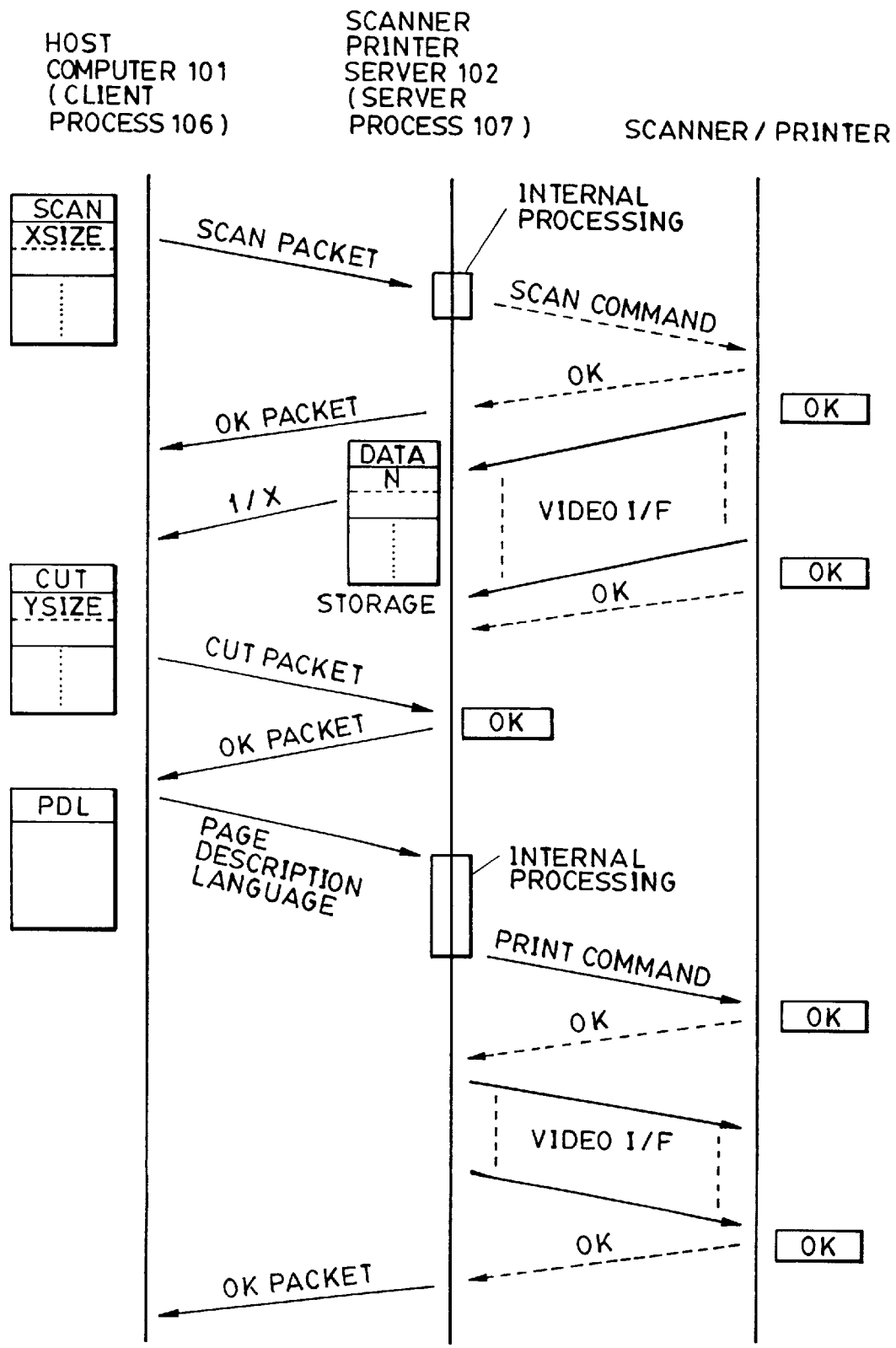
FIG. 21 illustrates the scanning operation and an operation of developing PDL data.

In the arrangement shown in FIG. 21, the client process 106 transmits a SCAN packet to the server process 107, the SCAN packet being composed of XSIZE, YSIZE, XSTART, YSTART, XSTEP and YSTEP and the like. The server process 107 sets each parameter for the image process to be performed by the server in accordance with the instruction included in the SCAN packet. An instruction relating to the size of the image is transmitted to the scanner 103 through the serial interface 207.

The scan 103 sets a parameter into the image reading section 305 in accordance with the information about the scan command. If the aforesaid parameters have been correctly set, the scan 103 returns OK to the server process 107.

When the server process 107 has received OK from the scanner, it returns an OK packet to the client process 106. If it has not been set correctly, it returns status information to the server process 107.

When the scanner 103 has received the scan command, it reads an image from the Video I/F for each line.

At the time of the scanning operation, the timing control circuit 208 of the scanner printer server 102 makes the HSYNC (the horizontal synchronizing signal) 110, the VSYNC (the vertical synchronizing signal) 109, the CLOCK (the clock signal) 111, and the DATA (the image data signal) 108 to be high impedance. Furthermore, it reads data from the DATA (the image data signal) 108 in synchronization with the HSYNC (the horizontal synchronizing signal) 110, the VSYNC (the vertical synchronizing signal) 109 and the CLOCK (the clock signal) 111 generated by the scanner 103 so as to read and write data to the dual port rams 205 and 206.

The server process 107 reads the image data, which has read from the Video I/F for each line, from the dual port rams 205 and 206 so as to write the image data to the hard disk 212.

If there is an instruction to transfer thinned data issued from the host computer, the image is thinned in accordance with the thinning ratio of XSTEP and YSTEP instructed with the SCAN packet simultaneously with the operation of writing data to the dual port rams 205 and 206. The aforesaid data is divided into an adequate size or combined with each other so that a plurality of DATA packets are formed, each of which is composed of a DATA tag, the number of bytes of the packet and the image data are formed, the DATA packets being then transferred to the client process 106 of the host computer 101.

The client process 106 of the host computer 101 fetches the thinned image data from the image packet supplied from the server process 107 so as to display it on the CRT.

When the scanner has normally transmitted all of the images, it transmits OK to the server process 107 through the scanner serial interface 301.

When the server process 107 has received OK from the scanner, it transmits an OK packet to the client process 106.

When the server process 107 has transmitted the OK packet to the client process 106, it waits for the next command packet to be supplied from the client process 106. The client process 106 receives all of the thinned images so as to display them on the CRT. Then, it inquires of the user the region of the image to be actually scanned. The user instructs the required region by using a pointing device such as a mouse.

Then, the instructed region is instructed to the client process 106. Then, the client process 106 transmits a CUT packet composed of XSIZE, YSIZE, XSTART and YSTART, and the like to the server process 107.

When the server process 107 has received the CUT packet, it returns OK to the client process 106 if information about it has been set correctly.

Then, the client process 106 transmits the page description language processed by another application program to the server process 107.

The server process 107 develops the page description language by the interpreter 214 so that the character or the graphic bit map is processed. The image data read by the scanner and stored by the image storage means is read to a place instructed with the page description language from the region instructed with the CUT packet so as to be synthesized to the aforesaid bit map. The server process 107 transfers the synthesized image data to the printer so as to cause it to be printed. If there is an instruction to process the image with the page description language, the image data is read from the image storage means and simultaneously processed.

When the server process 107 has normally transmitted all of the images to the printer, it transmits an OK packet to the client process 106. If an instruction is made by the client process 106 to perform continuous printing, the server process transfers the image data, which has been developed in the bit map manner, to the printer.

When the server process 107 has transmitted the OK packet to the client process 107, it waits for the next command packet to be supplied from the client.

When the client process 106 has received the OK packet from the server process 107, it waits for the next command issued from the user.

FIGS. 18*a*–18*h* illustrates the structure of the packet.

FIG. 18A illustrates the PRESCAN packet, 18B illustrates the SCAN packet and 18C illustrates the PRINT packet.

The first byte of each packet is a tag which indicates the type of the packet. For example, when the PRESCAN is 1, the fact that pre-scanning is performed is indicated. When the SCAN is 2, the fact that scanning is performed is indicated.

SCANNER NAME and PRINTER NAME are used to instruct the device name with which an image is inputted/outputted.

DATA TYPE is used to instruct the fact that the image data is in the page description language form, the compressed image form or the raw image data form.

XSIZE shows the X directional size of an image and formed by 2 bytes, while YSIZE shows the Y directional size of an image and is formed by 2 bytes.

XSTART shows the image scan or print start position in the direction X and is formed by 2 bytes, and YSTART shows the scan or print start position in the direction Y and is formed by 2 bytes.

XZOOM shows the scan or print resolution in the direction Z and is formed by 1 byte, while YZOOM shows the scan or print resolution in the direction Y and is formed by 1 byte.

FORMAT shows the method of scanning the image in such a manner that the dot sequential method is instructed with 1, the line sequential method is instructed with 2, and the plane sequential method is instructed with 3.

EDGE shows the degree of edge emphasis and the smoothing operation in such a manner that the edge emphasis is instructed with 16 to 1 and smoothing is instructed with −1 to −16.

COLOR TYPE shows the color space for the image in such a manner that RGB is instructed with 1 and YCrCb is instructed with 2. In a case of RGB, the first color is called R, the second color is called G and the third color is called B. In a case of YCrCb, the first color is called Y, the second color is called Cr, and the third color is called Cb.

COLOR shows the color of the image to be transmitted. In a case where only the first color is transmitted, the second bit is made to be 1, in a case where only the second color is transmitted, the first bit is made to be 1, and in a case where only the third color is transmitted, the 0-th bit is made to be 1. If all of RGB colors are transmitted in a case where COLOR TYPE is RGB, color becomes 7. If R and B are transmitted, it becomes 5 (the first color=4, and the third color=1). Similarly, in a case where COLOR TYPE is YCrCb and only Y is transmitted, it becomes 4.

LEVEL is formed by 2 bytes in which the first 4 bits show the number of gradations of the first color, the next 4 bits show the number of gradations of the second color, and the next 4 bits show the number of gradations of the third color. The final 4 bits are undefined.

The aforesaid number of gradations are instructed with two exponents in such a manner that 8 is used to instruct 256 gradations and 6 is used to instruct 64 gradations. CODE shows the encoding method in such a manner that 0 is used to instruct a case where encoding is not performed and 1 is used to instruct a case where encoding is performed in accordance with the ADCT.

UCR shows α at the time of generating black.

BI-LEVEL shows the binary coding method in such a manner that 0 shows the fact that the print engine 606 is a multi-value printer and therefore the binary coding operation is not performed, 1 shows a fattening pattern of a dither method, 2 shows a bayer pattern of the dither method, 3 shows a simple binary coding method, and 4 shows an error diffusion method.

THERESHOLD shows the binary coding threshold (0 to 255) of the simple binary coding method.

PAGCE shows the number of pages to be printed.

FIG. 19D shows OK which is a kind of status information, OK being composed of only an OK tag formed by 1 byte.

FIG. 19E shows the GAMMA setting command having the second byte, the S/P of which shows the gamma table of the scanner 103 or that of the printer 104 to which setting is made. The ensuing portion is composed of 768 bytes for three colors each of which is assigned to 256 bytes.

FIG. 19F shows the MASKING setting command composed of a masking tag and a masking parameter composed of a fixed point formed by 2 bytes.

FIG. 19G shows the STATUS information composed of a status tag, the number of the statuses, and the statuses.

FIG. 19H shows the copy command composed of a copy tag formed by 1 byte.

Then, the copying operation by using the scanner 103 and the printer 104 will now be described.

In a case where the copying operation is performed, the user depresses a copy button of an operation panel 306 for the scanner 103, so that the scanner control circuit transmits a copy command to the scanner printer server 102 through the scanner serial interface 301.

When the scanner printer server 102 has received the copy command, it transmits a scan command to the scanner 103 and transmits a print command to the printer 104. At this time, parameters for masking suitable for the copying operation are set.

When the scanner printer server 102 has received the copy command, it makes the HSYNC (the horizontal synchronizing signal) 110, the VSYNC (the vertical synchronizing signal) 109, the COLOR (the clock signal) 111 and the DATA (the image data signal) 108 signals to be high impedance.

When the scanner 103 has received the scan command, the scanner control circuit of the scan 103 reads the image in accordance with setting made through the operation panel 306 such as the print start position and the size of the image to be printed. Then, it transmits the HSYNC (the horizontal synchronizing signal) 110, the VSYNC (the vertical synchronizing signal) 109, the CLOCK (the clock signal) 111 and image data which synchronizes with it.

The printer timing control circuit 404 receives the image data in synchronization with the HSYNC (the horizontal synchronizing signal) 110, the VSYNC (the vertical synchronizing signal) 109 and the CLOCK (the clock signal) 111 supplied from the scanner 103 so that copying is performed by carrying out printing.

At the time of the copying operation, the timing control circu it of the scanner printer server 102 makes the HSYNC (the horizontal synchronizing signal) 110, the VSYNC (the vertical synchronizing signal) 109, the CLOCK (the clock signal) 111 arid the DATA (the image data signal) 108 to be high impedance.

Since scanning or printing of the image cannot be performed in a remote manner during the copying operation, the server process 107 transmits the STATUS packet denoting the fact that copying is being performed to the client process 106 when it has received the scan packet or the print packet so as to notify the user that scanning or printing cannot be performed.

In a case where image scanning or printing is being performed in the remote manner, copying cannot be performed. Therefore, the scanner CPU 302 displays on the operation panel 306 the fact that operation of the scanner or the printer is being performed so as to reject the copying operation.

Although this embodiment of the present invention is arranged to use the bus type ethernet 105 as the network, any network can be easily employed.

Although this embodiment of the present invention is arranged to use serial communication to communicate data such as commands, parameters and errors between the scanner printer server 102 and the scanner 103 or the printer 104, an arbitrary communication interface may be used as an alternative to serial communication.

Although this embodiment of the present invention is arranged to use serial communication to communicate data such as commands, parameters and errors between the scanner printer server 102 and the scanner 103 or the printer 104 and the video interface is used to communicate image data, the present invention is not limited to the aforesaid communication interfaces. An interface such as the SCSI or GPIB which is able to communicate data in a bidirectional manner may be used to communicate information such as commands, the parameters and errors through the same communication passage for transmitting the image data.

Although this embodiment of the present invention is arranged to transmit the image by performing encoding by the ADCT encoding method in a case where the image is formed into the dot sequential YCrCb form, the present invention is not limited to the ADCT encoding method. Therefore, any encoding method may be employed. As a result, encoding of images except for the dot sequential YCrCb form can be performed and the image can be compressed before it is transmitted.

Although this embodiment of the present invention uses a dual port ram for one line, the present invention is not limited to this. A memory for a plurality of lines or for one frame can be provided so as to raise the processing speed.

Although this embodiment of the present invention is so arranged that the image is thinned before it is transmitted at the time of the pre-scan operation and the image is not thinned before it is transmitted at the time of the main scan, the image may be transmitted at the time of pre-scanninrg a color image by combining the following methods:

(1) Only the monocolor component is transmitted.
(2) The image is thinned before it is transmitted.
(3) The image is encoded before it is transmitted.
(4) The gradation of the image is lowered before it is transmitted.
(5) The resolution of the image is lowered before it is transmitted.

This embodiment of the present invention is arranged in such a manner that the image is read at the time of the pre-scanning operation, the image data is stored in the hard disk 212 and is thinned before it is transmitted. At the time of the main scanning operation, the image stored in the hard disk 212 is read so as to be transferred. However, the image is not stored in the hard disk at the time of the pre-scanning operation and it is directly transmitted by combining the following methods:

(1) Only the monocolor component is transmitted.
(2) The image is thinned before it is transmitted.
(3) The image is encoded before it is transmitted.
(4) The gradation of the image is lowered before it is transmitted.
(5) The resolution of the image is lowered before it is transmitted.

The image may be again scanned before it is transferred at the time of the main scanning operation.

This embodIment of the present invention is so arranged that the scan engine 505 performs scanning three times in a case where the image is read and it is scan-converted into the plane sequential form before it is transferred. However, an arrangement may be employed in which the image is read only one time, the image data is stored in the hard disk 212 and the image in the hard disk 212 is read three times. As a result, the number of the mechanical scanning operations can be decreased to one time and therefore the processing speed can be raised.

Another arrangement may be employed in which the image is stored in the hard disk 212, simultaneously the scan conversion of the first color is performed, and the residual two times are read from the hard disk.

This embodiment of the present invention is arranged in such a manner that the image is binary-coded by the binary coding section 605 since the binary print engine is used. However, the present invention is not limited to the binary print engine and therefore an arrangement may be employed in which an N-value coding section is provided in a case where the N-value print engine is used, so that the present invention is able to be easily adapted to the engine of the aforesaid type.

As described above, a plurality of scanners and printers are connected to the scanner printer server while utiizing the functions of their devices. If the devices do not have the functions, the function of the server is utilized. As a result, various scanners and printers can be utilized in the same environment of the host computer. For example, in a case where the function of developing the page description language is provided for the printer, it is utilized as is. If the same is not provided, the function is included by the server and is utilized to perform the bit map development so that an output from an instructed printer is made. Furthermore, various parameters for the scanner or the printer can be instructed from the host computer on the network and therefore a complicated operation can be performed.

Furthermore, a storage means for storing the scanned image is provided for the scanner printer server, the image is temporarily stored in the aforesaid storage means at the time of the pre-scanning operation, and the stored image is read at the time of the main scanning operation. As a result, the required number of the scanning operations can be reduced from the two times to one time. Hence, the image can pre read at high speed.

In a case where a plurality of prints are made, the image is stored in the storage means at the time of printing the first sheet and the image is read from the storage means for the two and ensuing sheets so as to be printed. Therefore, the image may be transferred only one time and hence the printing operation can be performed at high speed.

Furthermore, a color image is transmitted at the time of the prescanning operation by combining the following methods:

(1) Only the monocolor component is transmitted.
(2) The image is thinned before it is transmitted.
(3) The image is encoded before it is transmitted.
(4) The gradation of the image is lowered before it is transmitted.
(5) The resolution of the image is lowered before it is transmitted.

As a result, the image can be transmitted after it has been compressed and therefore an excellent effect can be obtained in that the quantity of communication can be reduced.

Furthermore, since a bidirectional communication passage is provided, the copying operation can be rejected in a period in which the scanner printer is being used from the network and the scanner printer cannot be used from the network at the time of the copying operation.

Although the invention has been described in its preferred form with particularity, it is understood that the present disclosure of the preferred form may be changed in the details of construction and the combination and arrangement of parts may be varied without departing from the spirit and the scope of the invention as hereinafter claimed.

What is claimed is:

1. A scanner printer server connectable to a plurality of printers and a scanner, comprising:
   means for receiving print data in the form of a print packet from a host computer via a network, said receiving means being for receiving print data described in a first representation and print data described in a second representation, said receiving means further being for receiving a scan packet from the host computer via the network;
   first discriminating means for discriminating whether the received print data is described in the first representation or in the second representation;
   means for specifying a printer from the plurality of printers which is to print an image corresponding to the received print data;
   second discriminating means for discriminating whether the specified printer is capable of processing print data in the discriminated representation;
   means for converting the received print data into printer data in another representation when the specified printer is not capable of processing print data in the discriminated representation; and
   means for transmitting a status packet, denoting that copying is being performed, to the host computer via the network when copying is being performed by the scanner and the specified printer,
   said transmitting means further transmitting a scan command to the scanner when the scan packet is received from the host computer via the network when copying is not currently being performed and transmitting a print command to the specified printer when the print packet is received from the host computer via the network when copying is not currently being performed.

2. A scanner printer server according to claim 1, wherein the print data described in the first representation is one of image data compressed by a predetermined compression method and code data in page description language, and the print data described in the second representation is bit map image data.

3. A scanner printer server according to claim 2, wherein said second discriminating means discriminates whether the specified printer is capable of processing one of the compressed image data and the code data in the page description language or not, when said first discriminating means discriminates the received print data is said one of the compressed image data and the code data in the page description language.

4. A scanner printer server according to claim 1, further comprising a memory for storing the print data converted by said converting means when said printer server receives an instruction for making multiple copies.

5. A scanner printer server according to claim 1, wherein said specifying means specifies a printer which is to print an image corresponding to the received print data in accordance with designation data for designating a printer sent from the host computer.

6. An image processing method in a scanner printer server connectable to a plurality of printers and a scanner, comprising the steps of:
   receiving print data in the form of a print packet from a host computer via a network, said receiving step being for receiving print data described in a first representation and print data described in a second representation, said receiving step further being for receiving a scan packet from the host computer via the network;
   discriminating whether the received print data is described in the first representation or the second representation;
   specifying a printer from the plurality of printers which is to print an image corresponding to the received print data;
   discriminating whether the specified printer is capable of processing print data in the discriminated representation;
   converting the received print data into print data in another representation, when the specified printer is not capable of processing print data in the discriminated representation; and
   transmitting a status packet, denoting that copying is being performed, to the host computer via the network when copying is being performed by the scanner and the specified printer, said transmitting step further transmitting a scan command to the scanner when the scan packet is received from the host computer via the network when copying is not currently being performed and transmitting a print command to the specified printer when the print packet is received from the host computer via the network when copying is not currently being performed.

7. A method according to claim 6, wherein the print data described in the first representation is one of image data compressed by a predetermined compression method and code data in page description language, and the print data described in the second representation is bit map image data.

8. A method according to claim 7, wherein in said second discriminating step, it is discriminated that the specified printer is capable of processing one of the compressed image data and the code data in the page description language, when it is discriminated that the received print data is said one of the compressed image data and the code data in the page description language in said first discriminating step.

9. A printer server according to claim 6, further comprising a step of storing the print data converted by said converting means into a memory, when said printer server receives an instruction for making multiple copies.

10. A printer server according to claim 6, wherein in said specifying step, a printer which is to print an image corresponding to the received print data is specified in accordance with designation data for designating a printer sent from the host computer.

11. A scanner printer server connectable to a peripheral apparatus having a scanner and a printer, said server comprising:

means for receiving information from a host computer via a network, said receiving means being for receiving each of a scan packet and a print packet from the host computer via the network; and means for transmitting a status packet, denoting that copying is being performed, to the host computer via the network when copying is being performed by the scanner and the printer, said transmitting means further transmitting a scan command to the peripheral apparatus when the scan packet is received from the host computer via the network when copying is not currently being performed and transmitting a print command to the peripheral apparatus when the print packet is received from the host computer via the network when copying is not currently being performed.

12. A server according to claim 11, wherein the peripheral apparatus includes an operation panel that displays that one of the scanner and the printer is being operated when scanning or printing, respectively, is being performed remotely in response to a command received from said server.

13. A scanner printer server system including a scanner printer server, a host computer and a peripheral apparatus, having a scanner and a printer, on a network, said system comprising, in said server:

means for receiving information from said host computer via the network, said receiving means being for receiving each of a scan packet and a print packet from said host computer via the network; and means for transmitting a status packet, denoting that copying is being performed, to said host computer via the network when copying is being performed by said scanner and said printer, said transmitting means further transmitting a scan command to said peripheral apparatus when the scan packet is received from said host computer via the network when copying is not currently being performed and transmitting a print command to said peripheral apparatus when the print packet was received from said host computer via the network when copying is not currently being performed.

14. A system according to claim 13, wherein said peripheral apparatus includes an operation panel that displays that one of said scanner and said printer is being operated when scanning or printing, respectively, is being performed remotely in response to a command received from said server.

* * * * *

UNITED STATES PATENT AND TRADEMARK OFFICE
CERTIFICATE OF CORRECTION

PATENT NO. : 5,933,580

DATED : August 3, 1999

INVENTOR(S) : TOYOKAZU UDA

It is certified that error appears in the above-identified patent and that said Letters Patent is hereby corrected as shown below:

COLUMN 1

Line 7, "a integrated" should read --an integrated--

COLUMN 3

Line 15, "illustrates" should read --illustrate--.
   Line 16, "illustrates" should read --illustrate--.

COLUMN 4

Line 18, "represent" should read --represents--.
   Line 37, "1(03" should read --103--.
   Lines 38, "arid" should read --and--.

COLUMN 6

Line 37, "gamma" should read --gamma conversion--.
   Lines 38-39, "scan conversion section 505" should be deleted.
   Line 47, "(dot" should read --(dots--.
   Line 67, "range s so" should read --range is so--.

UNITED STATES PATENT AND TRADEMARK OFFICE
CERTIFICATE OF CORRECTION

PATENT NO. : 5,933,580

DATED : August 3, 1999

INVENTOR(S) : TOYOKAZU UDA

It is certified that error appears in the above-identified patent and that said Letters Patent is hereby corrected as shown below:

<u>COLUMN 7</u>

```
Line 1,  "Cr and Cr" should read --Cr and Cb-.
Line 13, "RGH" should read --RGB--.
Line 26, "can he" should read --can be-.
Line 46, "aforeoaid" should read --aforesaid--.
Line 56, "(C,M,Y,)" should read --(C,M,Y))--.
```

<u>COLUMN 8</u>

```
Line 21, "ROB" should read --RGB--.
```

<u>COLUMN 9</u>

```
Line 22, "form the" should read --form to the--.
```

<u>COLUMN 10</u>

```
Line 22, "Then, the" should read --The--.
Line 31, "imago" should read --image--.
Line 60, "pr(e-scanning" should read --pre-scanning--.
```

UNITED STATES PATENT AND TRADEMARK OFFICE
CERTIFICATE OF CORRECTION

PATENT NO. : 5,933,580

DATED : August 3, 1999

INVENTOR(S) : TOYOKAZU UDA

It is certified that error appears in the above-identified patent and that said Letters Patent is hereby corrected as shown below:

COLUMN 11

Line 36, "thee" should read --the--.
    Line 59, "poanting" should read --pointing--.

COLUMN 13

Line 21, "intepreting" should read --interpreting--.

COLUMN 14

Line 27, "intepreting" should read --interpreting--.
    Line 40, "been" (both occurrences) should be deleted.
    Line 51, "been" should be deleted.
    Line 59, "waits or" should read --waits for--.

COLUMN 15

Line 21, "printor." should read --printer.--; and
      "if" should read --If--.

UNITED STATES PATENT AND TRADEMARK OFFICE
CERTIFICATE OF CORRECTION

PATENT NO. : 5,933,580

DATED : August 3, 1999

INVENTOR(S) : TOYOKAZU UDA

It is certified that error appears in the above-identified patent and that said Letters Patent is hereby corrected as shown below:

COLUMN 17

Line 43, "18a-18h" should read --18a-18i--; and
       "illustrates" should read --illustrate--.
    Line 44, "18A" should read --18a--; and "18B"
       should read --18b--.
    Line 45, "18C" should read --18c--.
    Line 58, "formed" should read --is formed--.

COLUMN 18

Line 44, "THERESHOLD" should read --THRESHOLD--.
    Line 46, "PAGCE" should read --PAGE--.
    Line 47, "19D" should read --19d--.
    Line 49, "19E" should read --19e--.
    Line 54, "19F" should read --19f--.
    Line 57, "19G" should read --19g--.
    Line 59, "19H" should read --19h--.
    Line 61, "Then, the" should read --The--.

UNITED STATES PATENT AND TRADEMARK OFFICE
CERTIFICATE OF CORRECTION

PATENT NO. : 5,933,580

DATED : August 3, 1999

INVENTOR(S) : TOYOKAZU UDA

It is certified that error appears in the above-identified patent and that said Letters Patent is hereby corrected as shown below:

COLUMN 19

Line 27, "circu it" should read --circuit--.
Line 30, "arid" should read --and--.
Line 63, "the parameters" should read --parameters--.

COLUMN 20

Line 15, "pre-scanninrg" should read --pre-scanning--.

COLUMN 21

Line 18, "pre read" should read --be read--.

UNITED STATES PATENT AND TRADEMARK OFFICE
CERTIFICATE OF CORRECTION

PATENT NO. : 5,933,580

DATED : August 3, 1999

INVENTOR(S) : TOYOKAZU UDA

It is certified that error appears in the above-identified patent and that said Letters Patent is hereby corrected as shown below:

COLUMN 22

Line 28, "discriminates the" should read
--discriminates that the--.

Signed and Sealed this

Second Day of May, 2000

Q. TODD DICKINSON

Attest:

Attesting Officer

Director of Patents and Trademarks